United States Patent
Tamai et al.

(10) Patent No.: US 11,136,447 B2
(45) Date of Patent: Oct. 5, 2021

(54) POLYAMIDE RESIN COMPOSITION AND MOLDED ARTICLE CONTAINING SAME

(71) Applicant: Toray Industries, Inc., Tokyo (JP)

(72) Inventors: Akiyoshi Tamai, Nagoya (JP); Hiroshi Nakagawa, Nagoya (JP); Masaru Akita, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 111 days.

(21) Appl. No.: 16/346,986

(22) PCT Filed: Nov. 10, 2017

(86) PCT No.: PCT/JP2017/040547
§ 371 (c)(1),
(2) Date: May 2, 2019

(87) PCT Pub. No.: WO2018/092686
PCT Pub. Date: May 24, 2018

(65) Prior Publication Data
US 2020/0062925 A1    Feb. 27, 2020

(30) Foreign Application Priority Data

Nov. 15, 2016 (JP) ............................. JP2016-222594
May 15, 2017 (JP) ............................. JP2017-096277

(51) Int. Cl.
| | |
|---|---|
| *C08K 5/3492* | (2006.01) |
| *C08J 3/20* | (2006.01) |
| *C08K 3/16* | (2006.01) |
| *C08K 5/378* | (2006.01) |
| *C08K 5/47* | (2006.01) |
| *C08L 77/06* | (2006.01) |

(52) U.S. Cl.
CPC ......... *C08K 5/34924* (2013.01); *C08J 3/203* (2013.01); *C08K 3/16* (2013.01); *C08K 5/378* (2013.01); *C08K 5/47* (2013.01); *C08L 77/06* (2013.01); *C08J 2377/00* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 7,435,769 B2 | 10/2008 | Kishimoto et al. | |
| 2003/0114567 A1 | 6/2003 | Onishi et al. | |
| 2004/0261660 A1 | 12/2004 | Li et al. | |
| 2008/0026246 A1 | 1/2008 | Saga | |
| 2009/0275678 A1 | 11/2009 | Kumazawa et al. | |
| 2012/0149837 A1* | 6/2012 | Kumazawa .............. | C08K 5/06 524/605 |
| 2016/0053115 A1 | 2/2016 | Roth | |

FOREIGN PATENT DOCUMENTS

| | | |
|---|---|---|
| CN | 1144853 A | 3/1997 |
| CN | 1425714 A | 6/2003 |
| CN | 1761721 A | 4/2006 |
| CN | 1826376 A | 8/2006 |
| CN | 101511944 A | 8/2009 |
| CN | 102070898 A | 5/2011 |
| CN | 104761896 | 7/2015 |
| CN | 106084765 A | 11/2016 |
| JP | 59-027948 | 2/1984 |
| JP | S62-195043 A | 8/1987 |
| JP | 63-105057 | 5/1988 |
| JP | 05-071014 | 3/1993 |
| JP | 05-093134 A | 4/1993 |
| JP | 05-295252 | 11/1993 |
| JP | 07-003150 | 1/1995 |
| JP | 07-062232 | 3/1995 |
| JP | 07-145316 | 6/1995 |
| JP | 07-216221 | 8/1995 |
| JP | 11-071516 | 3/1999 |
| JP | 2000-226730 | 8/2000 |
| JP | 2001-30238 A | 2/2001 |
| JP | 2002-283242 | 10/2002 |
| JP | 2006-273945 | 10/2006 |
| JP | 2009-070780 A | 4/2009 |
| JP | 2009-544808 | 12/2009 |
| JP | 2013-087226 A | 5/2013 |
| JP | 2014-037466 | 2/2014 |
| JP | 2015-28155 | 2/2015 |
| JP | 2015-529270 | 10/2015 |
| JP | 2016-79337 | 5/2016 |
| JP | 2016-515656 | 5/2016 |
| JP | 2016-155924 A | 9/2016 |
| JP | 2016-166335 | 9/2016 |
| JP | 2016-176060 | 10/2016 |

OTHER PUBLICATIONS

The first Office Action dated Jan. 27, 2021, of counterpart Chinese Application No. 201780068674.7, along with an English translation.

* cited by examiner

*Primary Examiner* — Robert T Butcher

(74) *Attorney, Agent, or Firm* — DLA Piper LLP (US)

(57) ABSTRACT

A polyamide resin composition includes 100 parts by weight of a polyamide resin (A), 0.1 to 50 parts by weight of a fire retardant (B), 0.001 to 1 part by weight of a metal and/or salt thereof (C), and 0.001 to 1 part by weight of a compound (D) as represented by formula [I]: QX [I] wherein in formula [I], Q represents an aromatic hydrocarbon group or an alicyclic hydrocarbon group and X represents a 5-membered heterocyclic ring group, Q and X forming a covalent bond or a fused ring.

9 Claims, 1 Drawing Sheet

POLYAMIDE RESIN COMPOSITION AND MOLDED ARTICLE CONTAINING SAME

TECHNICAL FIELD

This disclosure relates to a polyamide resin composition, more specifically, a polyamide resin composition and a molded article produced through molding thereof that are excellent in mechanical characteristics, heat aging resistance, flowability, fire retardancy, and press fitting property.

BACKGROUND

Being good in mechanical characteristics, heat resistance, and chemical resistance, polyamide resins have been suitably used in automobiles and electric/electronic components. Being high in heat aging resistance, polyamide resins have been used in components exposed to heat at high temperatures such as engine covers in the fields of automobiles. In recent years, components are arranged more densely in the engine rooms of automobiles and engines are increasing in output. Accordingly, the engine rooms now suffer from higher environment temperatures, requiring enhanced mechanical characteristics and heat aging resistance under higher temperature conditions. Compared to this, in the field of electric/electronic components, they have been used as materials of housing and internal components of notebook computers, printers, and portable devices particularly because of their characteristic high toughness. Furthermore, it is also used in internal connectors, wiring, cables, tubes, clips/binding bands for connecting or binding various components, and other small or thin parts.

In these fields, there are demands in recent years for materials that serve for uses under a wide range of working conditions and, specifically, materials having high flowability, heat aging resistance, and press fitting property, as well as high-level fire retardancy, are now sought after.

Polyamide resins with improved heat aging resistance have been disclosed, for example, such as a polyamide resin composition produced by mixing a polyamide resin with a copper compound and a halogen compound (see, for example, JP2006-273945A) and a carbon fiber reinforced thermoplastic resin composition produced by mixing a polyamide resin with carbon fiber, halogenated copper, and/or a derivative thereof (see, for example, JP2016-079337A).

For polyamide resins with improved fire retardancy, there are many proposed methods that use halogen based fire retardants such as bromine based fire retardants and a non-halogen fire retardants such as phosphorus based fire retardants. For example, some polyamide resin compositions produced by mixing a polyamide resin with a fire retardant, a hindered amine based stabilizer, and a cyanoacrylate based ultraviolet absorber are disclosed in, for example, JP2015-028155A.

For improved fire retardancy, heat aging resistance, and flowability, furthermore, there are, for example, polyamide resin compositions produced by mixing a polyamide resin with a fire retardant and a compound that has a hydroxyl group and/or an amino group in addition to an epoxy group and/or carbodiimide group and has the feature that the total number of hydroxyl groups and amino groups in one molecule is larger than the total number of epoxy groups and carbodiimide groups in one molecule in, for example, JP2016-176060A.

However, although the resin compositions and molded articles produced by techniques as described JP2006-273945A or JP2016-079337A contain copper compounds to capture radicals generated by heat or ultraviolet ray to realize improved heat aging resistance under high temperature conditions, they have to realize a combination of further improved fire retardancy and press fitting property to meet requirements for recent materials. The resin composition described in JP2015-028155A requires a large amount of fire retardant to develop high-level fire retardancy, and there are growing expectations for methods to realize further improvement in mechanical characteristics, heat aging resistance, flowability, and press fitting property in order to meet requirements for recent materials. There are growing expectations also for improvement in the mechanical characteristics and press fitting property of the resin composition described in JP2016-176060A.

It could therefore be helpful to provide a polyamide resin composition and a molded article produced therefrom that have excellent features in terms of heat aging resistance (more specifically, retained tensile elongation rate after heat treatment and changes in color tone of molded articles after heat treatment), flowability, fire retardancy, and press fitting property while retaining good mechanical characteristics of the polyamide resin.

SUMMARY

We found that a polyamide resin composition produced by mixing a polyamide resin with a fire retardant, a metal compound, and compounds having specific structures can be excellent in terms of mechanical characteristics, heat aging resistance, flowability, fire retardancy, and press fitting property.

We thus provide:

(1) A polyamide resin composition including 100 parts by weight of a polyamide resin (A), 0.1 to 50 parts by weight of a fire retardant (B), 0.001 to 1 part by weight of a metal and/or salt thereof (C), and 0.001 to 1 part by weight of a compound (D) as represented by formula [I]

$$QX \qquad [I]$$

In formula [I], Q represents an aromatic hydrocarbon group or an alicyclic hydrocarbon group and X represents a 5-membered heterocyclic ring group, Q and X forming a covalent bond or a fused ring.

(2) A polyamide resin composition as set forth in paragraph (1), wherein the metal and/or salt thereof (C) is at least one metal selected from the group consisting of copper, iron, zinc, nickel, manganese, cobalt, chromium, and tin, and/or at least one salt thereof.

(3) A polyamide resin composition as set forth in paragraph (2), wherein [N]/[M] is 0.1 or more and 2 or less, [M] representing the number of moles of the metal contained in the metal and/or salt thereof (C) as measured by atomic absorption spectroscopy and [N] representing the number of moles of the compound (D) in the polyamide resin composition extracted with acetone.

(4) A polyamide resin composition as set forth in any one of paragraphs (1) to (3), wherein X in the compound (D) is one selected from the group consisting of furan, pyrrole, imidazole, oxazole, thiazole, and pyrazole.

(5) A polyamide resin composition as set forth in any one of paragraphs (1) to (4), wherein the compound (D) is 2-mercaptobenzoimidazole and/or 2-mercaptobenzothiazole.

(6) A polyamide resin composition as set forth in any one of paragraphs (1) to (5), wherein the fire retardant (B) contains a triazine based compound.

(7) A polyamide resin composition as set forth in any one of paragraphs (1) to (6), wherein the fire retardant (B) is melamine cyanurate.

(8) A polyamide resin composition as set forth in any one of paragraphs (1) to (7) further including 0.1 to 20 parts by weight of a compound (E) containing at least three hydroxyl groups relative to 100 parts by weight of the polyamide resin.

(9) A molded article containing a polyamide resin composition as set forth in any one of paragraphs (1) to (8).

(10) A method for producing a polyamide resin composition as set forth in any one of paragraphs (1) to (8) by melt-kneading 100 parts by weight of a polyamide resin (A), 0.1 to 50 parts by weight of a fire retardant (B), 0.001 to 1 part by weight of a metal and/or salt thereof (C), and 0.001 to 1 part by weight of a compound (D) as represented by formula [I]

$$QX \qquad [I]$$

In formula [I], Q represents an aromatic hydrocarbon group or an alicyclic hydrocarbon group and X represents a 5-membered heterocyclic ring group, Q and X forming a covalent bond or a fused ring.

We produce a polyamide resin composition that has excellent features in terms of heat aging resistance, flowability, fire retardancy, and press fitting property while retaining good mechanical characteristics of the polyamide resin. Being excellent in terms of mechanical characteristics, heat aging resistance, flowability, fire retardancy, and press fitting property, the polyamide resin composition is useful as material for small electric/electronic components and automobile components.

EXPLANATION OF NUMERALS

Figure 1:
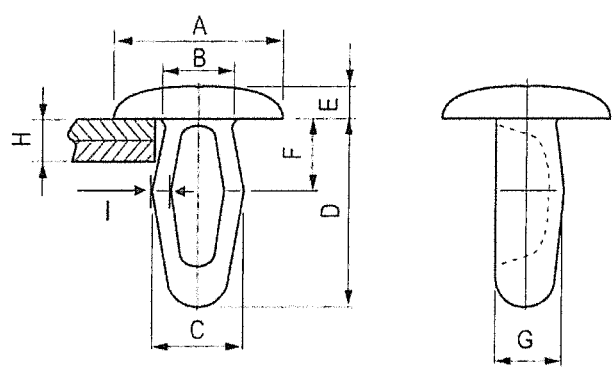
FIG. 1 shows a cross section of a canoe clip used for product evaluation in Examples.

A: diameter of canoe clip
J: diameter of mounting hole

DETAILED DESCRIPTION

Each component of the polyamide resin composition is described below.

The polyamide resin (A) is produced from (i) an amino acid, (ii) a lactam, or (iii) a diamine, and a dicarboxylic acid, as main raw materials.

Such raw materials for the polyamide resin (A) include amino acids such as 6-aminocaproic acid, 11-aminoundecanoic acid, 12-aminododecanoic acid, and para-aminomethyl benzoic acid; lactams such as ε-caprolactam and ω-laurolactam; aliphatic diamines such as tetramethylene diamine, pentamethylene diamine, hexamethylene diamine, 2-methyl pentamethylene diamine, nonamethylene diamine, decamethylene diamine, undecamethylene diamine, dodecamethylene diamine, 2,2,4-/2,4,4-trimethyl hexamethylene diamine, 5-methyl nonamethylene diamine, and 2-methyl octamethylene diamine; aromatic diamines such as meta-xylylene diamine and para-xylylene diamine; alicyclic diamines such as 1,3-bis(aminomethyl) cyclohexane, 1,4-bis(aminomethyl) cyclohexane, 1-amino-3-aminomethyl-3, 5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethyl piperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodiumsulfoisophthalic acid, 2,6-naphthalenedicarboxylic acid, hexahydroterephthalic acid, and hexahydroisophthalic acid; and alicyclic dicarboxylic acids such as 1,4-cyclohexanedicarboxylic acid, 1,3-cyclohexanedicarboxylic acid, 1,2-cyclohexanedicarboxylic acid, and 1,3-cyclopentane dicarboxylic acid.

Two or more of polyamide homopolymers or polyamide copolymers derived from these raw materials may be mixed to provide a material to use for the polyamide resin (A).

Specific examples of the polyamide resin include polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (nylon 1012), polyundecane amide (nylon 11), polydodecane amide (nylon 12), polycaproamide/polyhexamethylene adipamide copolymer (nylon 6/66), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene isophthalamide/polycaproamide copolymer (nylon 66/6I/6), polyhexamethylene terephthalamide/polyhexamethylene isophthalamide copolymer (nylon 6T/6I), polyhexamethylene terephthalamide/polyundecane amide copolymer (nylon 6T/11), polyhexamethylene terephthalamide/polydodecane amide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyxylylene sebacamide (nylon XD10), polyhexamethylene terephthalamide/polypentamethylene terephthalamide copolymer (nylon 6T/5T), polyhexamethylene terephthalamide/poly-2-methylpentamethylene terephthalamide copolymer (nylon 6T/M5T), polypentamethylene terephthalamide/polydecamethylene terephthalamide copolymer (nylon 5T/10T), polynonamethylene terephthalamide (nylon 9T), polydecamethylene terephthalamide (nylon 10T), polydecamethylene terephthalamide/polyhexamethylene dodecane amide copolymer (nylon 10T/612), polydecamethylene terephthalamide/polyhexamethylene adipamide copolymer (nylon 10T/66), and polydodecamethylene terephthalamide (nylon 12T). Specific examples of the polyamide resin also include mixtures and copolymers of these polymers. "/" is used to show a copolymer. This applies hereinafter.

Particularly preferable ones include polyamide 6, polyamide 66, polyamide 56, polyamide 610, polyamide 510, polyamide 410, polyamide 612, polyamide 11, polyamide 12, polyamide 6/66, polyamide 66/6T, polyamide 6T/6I, polyamide 66/6I/6, polyamide 6T/5T, polyamide 9T, polyamide 10T, and polyamide 12T. It is also practically preferable to mix two or more of these polyamide resins to develop required characteristics including moldability, heat resistance, and toughness.

Of these, aliphatic polyamides are preferred from the viewpoint of the dispersibility of the metal and/or salt thereof (C) as described later and high radical-scavenging ability, and polyamide 6, polyamide 66, polyamide 610, and polyamide 410 are particularly preferred. The radical-scavenging ability is the ability to capture radicals resulting from the decomposition of a polyamide resin. The above preferable polyamide resins are high in molecular mobility and diffuses rapidly in a composition containing the metal and/or salt thereof (C) described later, and accordingly they can capture radicals efficiently. As a result, resin compositions prepared from them will have improved heat aging resistance.

There are no specific limitations on the polymerization degree of these polyamide resins, it is preferable for them to have a relative viscosity ($\eta r$) of 1.5 to 5.0 as measured at 25° C. in a 98% concentrated sulfuric acid solution with a resin concentration of 0.01 g/ml. A relative viscosity of 1.5 or more ensures a good balance between strength and toughness and serves to realize a further improved toughness retention rate after heat aging. The relative viscosity is more preferably 2.0 or more and still more preferably 2.5 or more. On the other hand, a relative viscosity of 5.0 or less ensures a high molding processability. The shear heating in the melt-kneading step can be controlled appropriately and the polymer degradation due to thermal decomposition of the fire retardant etc. can be depressed, leading to further improvement in mechanical characteristics, heat aging resistance, and press fitting property.

There are no specific limitations on the fire retardant (B) as long as it can impart fire retardancy to the polyamide resin composition. Specific examples include non-halogen based fire retardants such as phosphorous fire retardants, nitrogen based fire retardants, and magnesium hydroxide, which contain no halogen atoms, and halogen based fire retardants such as bromine based fire retardants, and two or more of these fire retardants may be mixed. Of these, non-halogen based fire retardants are more preferred than halogen based fire retardants from the viewpoint of environmental impact and efficiency in imparting fire retardancy by their addition in small amounts, and nitrogen based fire retardants are still more preferred.

The phosphorous fire retardants are compounds that contain phosphorus, and their specific examples include red phosphorus, polyphosphoric acid based compounds such as polyphosphoric acid ammonium, as well as metal (di)phosphinates, aromatic phosphates, aromatic condensed phosphates, and halogenated phosphates. Two or more of them may be mixed. Of these, metal (di)phosphinates, aromatic phosphates, aromatic condensed phosphates, and halogenated phosphates are preferred.

There are no specific limitations on the nitrogen based fire retardant to use as long as it is a compound containing nitrogen. Commonly, generally known fire retardants can be used, but it is preferable for them to contain a triazine based compound. A triazine based compound is a nitrogen-containing compound having a triazine backbone. Examples of the triazine based compound include melamine, mono(hydroxymethyl) melamine, di(hydroxymethyl) melamine, tri(hydroxymethyl) melamine, benzoguanamine, acetoguanamine, 2-amide-4,6-diamino-1,3,5-triazine, of which melamine, benzoguanamine, and acetoguanamine are preferred. Nitrogen based fire retardants that contain triazine based compounds include, for example, salts of a cyanuric acid or an isocyanuric acid with a triazine based compound. A salt of a cyanuric acid or an isocyanuric acid with a triazine based compound is an addition product of a cyanuric acid or an isocyanuric acid with a triazine based compound, combined commonly at 1:1 (molar ratio) or 1:2 (molar ratio) in some cases. Specific examples of the salt of a cyanuric acid or an isocyanuric acid with a triazine based compound include melamine cyanurate, mono($\beta$-cyanoethyl) isocyanurate, bis($\beta$-cyanoethyl) isocyanurate, and tris-($\beta$-cyanoethyl) isocyanurate, of which melamine cyanurate is preferred. Polymelamine phosphates and phosphazene compounds that contain nitrogen and phosphorus are also preferred.

It is preferable for these nitrogen based fire retardants to have an average particle diameter of 50 µm or less. It is more preferably 20 µm or less and still more preferably 10 µm or less. A nitrogen based fire retardant with an average particle diameter of 50 µm or less serves to ensure further improvement in mechanical characteristics, heat aging resistance, and press fitting property. It is preferable for these nitrogen based fire retardants to have an average particle diameter of 0.3 µm or more. It is more preferably 0.5 µm or more and still more preferably 1.0 µm or more. A nitrogen based fire retardant with an average particle diameter of 0.3 µm or more serves to ensure further improvement in flowability and mechanical characteristics. There are no specific limitations regarding the average particle diameter ($D_{50}$), but it can determine by, for example, the laser diffraction scattering method. Specifically, measurements taken by the laser diffraction scattering method are plotted on a graph with the particle diameter on the horizontal axis and the frequency (mass) on the longitudinal axis, and the particle diameter where the accumulated mass accounts for 50% of the total of the accumulated mass over the entire frequency range is determined.

There are no specific limitations on the particle diameter, shape or the like, of the magnesium hydroxide to use and generally available commercial products can be adopted, but it is preferable for it to have a spherical, needle-like, or small plate-like shape with a particle diameter of 0.1 to 20 µm. The magnesium hydroxide may be either surface-treated or not. Effective surface treatment methods include, for example, coating with a silane coupling agent, anion surface active agent, polyfunctional organic acid, epoxy resin, or other thermosetting resin.

There are no specific limitations on the bromine based fire retardant to use and any generally known fire retardant will be useful as long as it is a compound that contains a bromine atom in its chemical structure. Examples thereof include monomer type organic bromine compounds such as hexabromobenzene, pentabromotoluene, hexabromobiphenyl, decabromobiphenyl, hexabromocyclodecane, decabromodiphenyl ether, octabromodiphenyl ether, hexabromodiphenyl ether, bis(pentabromophenoxy) ethane, ethylene bis(tetrabromophthalimide), and tetrabromobisphenol A; brominated polystyrenes such as brominated polycarbonate (for example, polycarbonate oligomer produced from brominated bisphenol A, or copolymer thereof with bisphenol A), brominated epoxy compound (for example, a diepoxy compound produced through reaction between brominated bisphenol A and epichlorohydrin, and a monoepoxy compound produced through reaction between brominated phenol and epichlorohydrin), poly(brominated benzyl acrylate), brominated polyphenylene ether, brominated bisphenol A, condensates between cyanuric chloride and brominated phenol, brominated polystyrene, poly(brominated styrene), and crosslinked brominated polystyrene; and halogenated polymer type bromine compounds such as crosslinked or non-crosslinked brominated polya-methyl styrene. In particular, ethylene bis(tetrabromophthalimide), brominated epoxy compounds, brominated polystyrene, crosslinked brominated polystyrene, brominated polyphenylene ether, and brominated polycarbonate are preferred, of which brominated polystyrene, crosslinked brominated polystyrene, brominated polyphenylene ether, and brominated polycarbonate are more preferred.

The polyamide resin composition may also contain a flame retardation assistant that work synergistically with a fire retardant as shown above to improve the fire retardancy. From the viewpoint of further increasing the fire retardancy, it is preferable for the flame retardation assistant to account for 0.2 to 30 parts by weight relative to 100 parts by weight of the polyamide resin (A). It is preferable to use antimony trioxide as flame retardation assistant.

Although the fire retardant (B) includes the preferred ones listed above, the metal and/or salt thereof (C) and (D), which will be described later, should be excluded.

The fire retardant (B) accounts for 0.1 to 50 parts by weight (0.1 part by weight or more and 50 parts by weight or less) relative to 100 parts by weight of the polyamide resin. If the content of the fire retardant (B) is less than 0.1 part by weight, it will lead to a molded article with decline fire retardancy. It is preferably 0.5 part by weight or more and more preferably 1 part by weight or more. If the content of the fire retardant (B) is more than 50 parts by weight, it will lead to a polyamide resin composition with considerably deteriorated mechanical characteristics or press fitting property. It is preferably 30 parts by weight or less, more preferably 20 parts by weight or less, still more preferably 10 parts by weight or less, and particularly preferably 5 parts by weight or less.

It is particularly preferable to use a nitrogen based fire retardant as the fire retardant (B) from the viewpoint of producing a molded article with further improved mechanical characteristics, fire retardancy, and press fitting property. Of the various nitrogen based fire retardants, the use of a triazine based compound, melamine cyanurate among others, is preferred. The mechanism of improvement in characteristics is not clearly known, but the improvement is thought to be attributed to the fact that the carboxylic acid resulting from the decomposition of the polyamide resin (A) heat-treated or melted in air is captured through reaction with the nitrogen based fire retardant.

The polyamide resin composition contains 0.001 to 1 part by weight (0.001 part by weight or more and 1 part by weight or less) of the metal and/or salt thereof (C) relative to 100 parts by weight of the polyamide resin. This means that the polyamide resin composition contains at least one selected from the group consisting of various metals and metal salts thereof that are represented as (C). Then, the total quantity of the metals and the metal salts thereof should account for 0.001 to 1 part by weight.

The metal in the metal and/or salt thereof (C) is preferably at least one selected from the group consisting of copper, iron, zinc, nickel, manganese, cobalt, chromium, and tin because they can easily capture radicals resulting from the decomposition of the polyamide resin (A) used for the present invention when heat-treated or melted in air and also because they are easily available.

With respect to the state of the metal and/or salt thereof (C), it may be in the form of simple metal, halogenated such as chlorinated, brominated, and iodinated, materials, oxides, sulfides, and nitrides, of which halogenated materials are preferred.

Examples of the metal and/or salt thereof (C) include, but not limited to, copper salts such as copper chloride, copper bromide, copper iodide, oxidized copper, copper sulfide, and copper nitride; iron salts such as iron chloride, iron bromide, iron iodide, iron oxide, iron sulfide, and iron nitride; zinc salts such as zinc chloride, zinc bromide, zinc iodide, zinc oxide, zinc sulfide, and zinc nitride; nickel salts such as nickel chloride, nickel bromide, nickel iodide, nickel oxide, nickel sulfide, and nickel nitride; manganese salts such as manganese chloride, manganese bromide, manganese iodide, manganese oxide, manganese sulfide, and manganese nitride; cobalt salts such as cobalt chloride, cobalt bromide, cobalt iodide, cobalt oxide, cobalt sulfide, and cobalt nitride; chromium salts chromium chloride, chromium bromide, chromium iodide, chromium oxide, chromium sulfide, and chromium nitride; tin salts such as tin chloride, tin bromide, tin iodide, tin oxide, tin sulfide, tin nitride; and mixtures thereof.

It is preferable for the metal of the metal and/or salt thereof (C) to be mixed with at least one selected from the group consisting of alkali metals such as lithium, sodium, potassium, and cesium and alkaline earth metals such as magnesium, calcium, and barium. In particular, halogenated, such as chlorinated, brominated, and iodinated, materials are preferred, and examples include lithium salts such as lithium chloride, lithium bromide, and lithium iodide; sodium salts such as sodium chloride, sodium bromide, and sodium iodide; potassium salts such as potassium chloride, potassium bromide, and potassium iodide; cesium salts such as cesium chloride, cesium bromide, and cesium iodide, magnesium salts such as magnesium chloride, magnesium bromide, and magnesium iodide; calcium salts such as calcium chloride, calcium bromide, and calcium iodide; barium salts such as barium chloride, barium bromide, and barium iodide; and mixtures thereof.

Of the above examples of the metal and/or salt thereof (C), halogenated coppers such as copper chloride, copper bromide, and copper iodide are preferred. The combination of a copper iodide and lithium chloride is particularly preferred due to their effect for further improvement in heat aging resistance, fire retardancy, and press fitting property.

The metal and/or salt thereof (C) accounts for 0.001 to 1 part by weight relative to 100 parts by weight of the polyamide resin. If the metal and/or salt thereof (C) accounts for only less than 0.001 part by weight, it will be impossible to achieve a sufficiently large improvement in heat aging resistance, fire retardancy, and press fitting property. The quantity is more preferably 0.005 part by weight or more and still more preferably 0.01 part by weight or more. If the metal and/or salt thereof (C) accounts for more than 1 part by weight, on the other hand, the metal and/or salt thereof (C) will be eluted to lead a polyamide resin composition having deteriorated mechanical characteristics, fire retardancy, or press fitting property. The quantity is preferably 0.5 part by weight or less, more preferably 0.2 part by weight or less, and still more preferably 0.1 part by weight or less.

The polyamide resin composition contains 0.001 to 1 part by weight of a compound (D) as represented by formula [I] given below relative to 100 parts by weight of the polyamide resin QX [I]

in formula [I], Q represents an aromatic hydrocarbon group or an alicyclic hydrocarbon group and X represents a 5-membered heterocyclic ring group, Q and X forming a covalent bond or a fused ring.

For the compound (D), Q in formula [I] is one selected from aromatic ring or alicyclic compounds. In an aromatic ring compound, it preferably contains 6 to 14 carbon atoms, and examples include benzene, naphthalene, and anthracene, of which benzene is preferred from the viewpoint of heat aging resistance and fire retardancy In an alicyclic compound, it is preferable for the alicyclic compound to contain 5 to 14 carbon atoms, and examples include cycloalkanes, polycycloalkanes, and unsaturated forms thereof, of which cyclohexanes are preferred from the viewpoint of heat aging resistance and fire retardancy.

The compound (D) is a heterocyclic compound wherein X in formula [I] is a 5-membered ring, and examples thereof include furan, pyrrole, imidazole, oxazole, thiazole, and pyrazole. In particular, it is preferably a compound selected from the group consisting of imidazole, oxazole, and thiazole from the viewpoint of heat aging resistance and press fitting property.

For the compound (D), Q and X in formula [I] form a covalent bond or a fused ring, and examples thereof include benzofuran, benzopyrrole, benzoimidazole, benzooxazole, benzothiazole, benzopyrazole, naphthofuran, naphthopyrrole, naphthoimidazole, naphthooxazole, naphthothiazole, naphthopyrazole, and hydrides thereof.

For the compound (D), it is preferable for X in formula [I] to have a substituent group, an examples of the substituent group include halogen atom, alkyl group, carboxyl group, sulfonyl group, cyano group, nitro group, hydroxyl group, thiol group, and amino group, of which the thiol group is preferred from the viewpoint of reactivity.

The compound (D) is preferably 2-mercaptobenzoimidazole and/or 2-mercaptobenzothiazole from the viewpoint of heat aging resistance, fire retardancy, and press fitting property. In particular, 2-mercaptobenzoimidazole is preferred from the viewpoint of heat aging resistance and press fitting property.

From the viewpoint of the coordination to the polyamide resin (A) or the fire retardant (B), the compound (D) preferably has a melting point of more than 290° C., more preferably more than 300° C., and still more preferably more than 310° C. As the melting point increases, the compound (D) will be slower to decompose, leading to effective coordination to the polyamide resin (A) or the fire retardant (B) and improvement in heat aging resistance and press fitting property. For the compound (D), the melting point (Tm) means the temperature at the melt endothermic peak and it is determined as the melt endothermic peak temperature in a DSC curve that is obtained by measuring the heat quantity as the compound (D) is heated up from 30° C. at a rate of 10° C./min according to JIS K 7121 (1987). The melting point can be measured by using a differential scanning calorimeter such as EXSTAR DSC6000 manufactured by Seiko Instruments Inc. If more than one melting endothermic peak is observed, the temperature of the melting endothermic peak located at the higher temperature position is adopted as Tm.

The compound (D) accounts for 0.001 to 1 part by weight (0.001 part by weight or more and 1 part by weight or less) relative to 100 parts by weight of the polyamide resin. If the compound (D) accounts for only less than 0.001 part by weight, it will be impossible for the metal and/or salt thereof (C) to disperse smoothly, failing to achieve a sufficiently large improvement in heat aging resistance, fire retardancy, and press fitting property. The quantity is more preferably 0.005 part by weight or more and still more preferably 0.01 part by weight or more. If the compound (D) accounts for more than 1 part by weight, it will lead to deterioration in mechanical characteristics or fire retardancy. The quantity is preferably 0.5 part by weight or less, more preferably 0.2 part by weight or less, and still more preferably 0.1 part by weight or less. Here, if a combination of two or more of the compounds listed above is used as the compound (D), they altogether should account for 0.001 to 1 part by weight.

[N]/[M] is preferably 0.1 or more and 2 or less to ensure further improvement in heat aging resistance and press fitting property wherein [M] is the number of moles, determined by atomic absorption spectroscopy, of the metal contained in the metal and/or salt thereof (C), which is at least one selected from the group consisting of copper, iron, zinc, nickel, manganese, cobalt, chromium, and tin and [N] is the number of moles of the compound (D) in the polyamide resin composition extracted with acetone. A [N]/[M] ratio of 0.1 or more ensures improvement in the dispersibility of the metal and/or salt thereof (C) in the polyamide resin (A), leading to further improvement in heat aging resistance and press fitting property. It is more preferable for the [N]/[M] ratio to be 0.12 or more, more preferably 0.15 or more. On the other hand, a [N]/[M] ratio of 2 or less serves to prevent deterioration in heat aging resistance or fire retardancy that may result from precipitation or isolation of the compound (D), leading to further improvement in press fitting property. It is more preferable for the [N]/[M] ratio to be 1.5 or less, more preferably 1 or less. The [N]/[M] ratio of the polyamide resin composition can be controlled in the above desired range by appropriately adjusting the quantities of the metal and/or salt thereof (C) and the compound (D).

The number of moles [M] of the metal (C) in the polyamide resin composition can be determined by the method described below. First, pellets of the resin composition are dried under reduced pressure. The pellets are incinerated in an electric furnace at 550° C. for 24 hours, and after adding concentrated sulfuric acid, the resulting ash is heated to achieve wet decomposition, followed by diluting the solution of decomposed ash. The diluted solution is examined by atomic absorption spectroscopy (calibration curve method) to determine the copper content.

The number of moles [N] of the compound (D) extracted with acetone from the polyamide resin composition can be determined by the method described below. First, pellets of the resin composition are dried under reduced pressure. A tenfold amount of acetone is added to the pellets and extraction is performed under reflux at 60° C. for 4 hours. After the extraction step, the acetone solution was cooled and recovered, and acetone is evaporated by an evaporator to achieve solidification, thereby obtaining an extract. Then, the resulting extract and a reference material for quantitative analysis were dissolved in a solvent, and the number of moles [N] of the compound (D) can be determined from the ratio between the peak intensity attributed to the compound (D) and the peak intensity of the reference material measured by 1H-NMR.

The polyamide resin composition contains the metal and/or salt thereof (C) and the compound (D) in combination. This is based on the founding that the incorporation of the metal and/or salt thereof (C) and the compound (D) in combination serves to realize further improvement in mechanical characteristics, heat aging resistance, flowability, fire retardancy, and press fitting property, which is the characteristic feature of our compositions compared to the conventional technique of incorporating copper compounds alone. Furthermore, incorporation of the metal and/or salt thereof (C) and the compound (D) in combination also increases the molecular mobility of the compound (D) in the resin composition to allow the compound (D) to be coordinated easily to the fire retardant (B) compared to using a complex formed by coordinating the compound (D) to the metal and/or salt thereof (C). As a result, the coordination of the metal and/or salt thereof (C) to the fire retardant (B) is depressed and relatively the number of metal ions of the metal and/or salt thereof (C) coordinated to the polyamide resin (A) can be increased. This is preferred because the coordination of the metal and/or salt thereof (C) to the polyamide resin (A) effectively develops of heat aging resistance and, accordingly, the metal and/or salt thereof (C), which is prevented from coordinating to the fire retardant (B), efficiently becomes active to coordinate to the polyamide resin (A), leading to further improvement in heat aging resistance, flowability, fire retardancy, and press fitting property. The mechanism of the above characteristics improvement has not been clarified yet, but it is believed that such improvement is brought about by the following multiple factors, in addition to the generally known effect of the metal and/or salt thereof (C) in capturing the radicals resulting from the decomposition of the polyamide resin (A): (1) the molecular coordination of the metal ions of the metal and/or salt thereof (C) makes it difficult for the amide group and carbonyl group in the polyamide resin (A) to form a resonance structure, preventing the release of hydrogen atoms from being caused as a result of heat degradation of the polyamide resin (A), (2) the diffusion rate of the metal and/or salt thereof (C) in the resin is increased to enhance the radical-scavenging ability of the metal and/or salt thereof (C), and (3) since the heat degradation temperature of the polyamide resin (A) is above the Tg (glass transition temperature) and below the Tm (melting point), the metal and/or salt thereof (C) acts to change the steric structure in the amorphous portion of the polyamide resin (A).

The metal and/or salt thereof (C) and the compound (D) preferably has a weight ratio ((C)/(D)) of 0.1 to 10.0 (0.1 or more and 10.0 or less). A weight ratio ((C)/(D)) of 0.1 or more ensures improvement in the dispersibility of the metal and/or salt thereof (C) and further improvement in its heat aging resistance. It is preferably 0.2 or more, more preferably 0.3 or more, and still more preferably 0.6 or more. On the other hand, a weight ratio ((C)/(D)) of 10.0 or less serves to prevent the deterioration in the mechanical characteristics, fire retardancy, or press fitting property. It is preferably 8.0 or less, more preferably 6.0 or less, and still more preferably 3 or less.

It is preferable for the polyamide resin composition to further contain a compound (E) containing at least three hydroxyl groups. A compound (E) containing hydroxyl groups can work effectively to improve molding processability (such as flowability) and heat aging resistance. The compound (E) containing hydroxyl groups is preferably an aliphatic compound. Compared to aromatic compounds and alicyclic compounds, aliphatic compounds are less liable to steric hindrance and higher in reactivity with the polyamide resin (A), leading to high compatibility with the polyamide resin (A) and further improvement in mechanical characteristics, heat aging resistance, and press fitting property. The compound (E) containing hydroxyl groups preferably contain four or more, more preferably six or more, hydroxyl groups in one molecule. The compound (E) containing hydroxyl groups may be a low molecular weight compound, a polymer, or a condensate.

In a low molecular weight compound, the number of hydroxyl groups in one molecule can be calculated on the basis of the structural formula of the compound determined by a common analysis method (for example, NMR, FT-IR, GC-MS, etc., used in combination). In a polymer, it can be calculated by Equation (1) from the number average molecular weight and hydroxyl value of the compound (E) containing hydroxyl groups.

$$\text{Number of OH groups} = (\text{number average molecular weight} \times \text{hydroxyl value})/56110 \quad (1)$$

The number average molecular weight of the compound (E) containing hydroxyl groups can be determined by using a solvent that dissolves the compound (E), such as hexafluoroisopropanol, as mobile phase and polymethyl methacrylate (PMMA) is used as reference material. For the measurement of the number average molecular weight, a column suited to the solvent to use (for example, Shodex GPC HFIP-806 M and/or Shodex GPC HFIP-LG, manufactured by Shimadzu GLC Ltd., is used when adopting hexafluoroisopropanol), and differential refractometer as detector.

The hydroxyl value of the compound (E) containing hydroxyl groups can be determined by acetylating the compound (E) with a mixed solution of acetic anhydride and pyridine anhydride and titrating the resulting solution with an ethanolic potassium hydroxide solution.

Specific examples of the compound (E) containing hydroxyl groups include 1,2,4-butanetriol, 1,2,5-pentanetriol, 1,2,6-hexanetriol, 1,2,3,6-hexanetetrol, glycerin, diglycerin, triglycerin, tetraglycerin, pentaglycerin, hexaglycerin, ditrimethylolpropane, tritrimethylolpropane, pentaerythritol, dipentaerythritol, tripentaerythritol, methylglucoside, sorbitol, glucose, mannitol, sucrose, 1,3,5-trihydroxybenzene, 1,2,4-trihydroxybenzene, ethylene-vinyl alcohol copolymer, polyvinyl alcohol, triethanol amine, trimethylol ethane, trimethylolpropane, 2-methylpropanetriol, tris-hydroxymethyl aminomethane, and 2-methyl-1,2,4-butanetriol. The compound (E) containing hydroxyl groups may also be a hydroxyl-containing compound having a repeating structural unit, and examples include hydroxyl-containing compounds having repeating structural units incorporating ester bond, amide bond, ether bond, methylene bond, vinyl bond, imine bond, siloxane bond, urethane bond, thioether bond, silicon-silicon bond, carbonate bond, sulfonyl bond, or imide bond. Such a hydroxyl-containing compound may have a repeating structural unit incorporating two or more of these bonds. It is preferable for the hydroxyl-containing compound having a repeating structural unit to be a hydroxyl-containing compound that has a repeating structural unit incorporating an ester bond, carbonate bond, ether bond, and/or amide bond.

A hydroxyl-containing compound having a repeating structural unit incorporating an ester bond can be produced by, for example, reacting a compound containing one or more hydroxyl groups with a monocarboxylic acid in which the carbon atoms located adjacent a carboxyl group are saturated carbon atoms and all hydrogen atoms on the carbon atom are substituted and each have two or more hydroxyl groups. A hydroxyl-containing compound having a repeating structural unit incorporating an ether bond can be produced by, for example, carrying out ring opening polymerization of a compound having one or more hydroxyl groups and a cyclic ether compound having one or more hydroxyl groups. A hydroxyl-containing compound having a repeating structural unit incorporating an ester bond and an amide bond can be produced by, for example, carrying out condensation polymerization reaction of an aminodiol and a cyclic anhydride. A hydroxyl-containing compound having a repeating structural unit incorporating an ether bond with an amino group can be produced by, for example, carrying out intermolecular condensation of trialkanol amine A hydroxyl-containing compound having a repeating structural unit incorporating a carbonate bond can be produced by, for example, carried out condensation polymerization reaction of an arylcarbonate derivative of tris-phenol.

Of these compounds (E) containing hydroxyl groups, pentaerythritol, dipentaerythritol, and tripentaerythritol are preferred.

Furthermore, the compound (E) containing hydroxyl groups may be a compound containing at least three hydroxyl groups produced by reacting aforementioned compound containing hydroxyl groups with a compound containing an epoxy group and/or carbodiimide group. Hereinafter, such a compound containing at least three hydroxyl groups produced by reacting the aforementioned compound containing hydroxyl groups with a compound containing an epoxy group and/or carbodiimide group is occasionally referred to as a hydroxyl-containing compound (e). Such a hydroxyl-containing compound (e) achieves further improvement in heat aging resistance. The mechanism of this has not been clarified, but it is believed as follows. First, a compound containing hydroxyl groups is reacted with a compound containing an epoxy group and/or carbodiimide group to form a hydroxyl-containing compound (e) having a multibranched structure in which the compound containing an epoxy group and/or carbodiimide group works as connecting point. Having a multibranched structure, the hydroxyl-containing compound (e) is smaller in autoagglutination tendency and accordingly higher in the reactivity and compatibility with the polyamide resin (A). In addition, the multibranched-structured hydroxyl-containing compound (e) will have an improved melt viscosity and accordingly, the hydroxyl-containing compound (e) will have an improved dispersibility in the polyamide resin composition. It is expected, therefore, a finely dispersed structure can be formed in the polyamide resin composition that can lead to further improvement in mechanical characteristics, heat aging resistance, and press fitting property.

It is preferable for the compound containing an epoxy group and/or carbodiimide group have two or more, more preferably four or more, and still more preferably six or more, epoxy and/or carbodiimide groups in one molecule. The epoxy group and carbodiimide group are high in compatibility with the polyamide resin (A) and it is expected accordingly that a compound having two or more epoxy and/or carbodiimide groups in one molecule can serve effectively to increase the compatibility between the polyamide resin (A) and the hydroxyl-containing compound (e). The compound containing an epoxy group and/or carbodiimide group may be either a low molecular weight compound or a polymer.

In a low molecular weight compound, the number of epoxy group or carbodiimide group in one molecule can be calculated on the basis of the structural formula of the compound determined by a common analysis method (for example, NMR, FT-IR, GC-MS and the like, used in combination). In a polymer, on the other hand, it can be calculated by dividing the number average molecular weight of the compound containing an epoxy group and/or carbodiimide group by the epoxy equivalent or carbodiimide equivalent.

The number average molecular weight of the compound containing an epoxy group and/or carbodiimide group can be determined by gel permeation chromatography.

The epoxy equivalent can be determined by dissolving the compound containing an epoxy group and/or carbodiimide group in hexafluoroisopropanol, adding acetic acid and a tetraethyl ammonium bromide/acetic acid solution, and titrating it with 0.1 N perchloric acid used as titrant using crystal violet as indicator, and making a calculation by Equation (2) from the titer at the point where the color of the solution turns from violet to blue-green.

$$\text{Epoxy equivalent [g/eq]} = W/((F-G) \times 0.1 \times f \times 0.001) \quad (2)$$

F is the quantity [ml] of 0.1 N perchloric acid required for titration; G is the quantity [ml] of 0.1 N perchloric acid required for titration of the control; f is the factor of 0.1 N perchloric acid; and W is the mass [g] of the specimen.

The carbodiimide equivalent can be calculated by the procedure described below. The compound containing an epoxy group and/or carbodiimide group is dry-blended with potassium ferrocyanide that is used as internal reference material and then hot-pressed at about 200° C. for 1 minute to prepare a sheet. Subsequently, the sheet was subjected to infrared absorption spectrometry by the transmission method using an infrared spectrophotometer. The measuring conditions include a resolution of 4 cm$^{-1}$ and integration performed 32 times. When performing infrared absorption spectrometry by the transmission method, the absorbance is inversely proportional to the thickness of the sheet and therefore the peak intensity of the carbodiimide group should be normalized using the peak of the internal reference. The absorbance at the peak attributed to the carbodiimide group, which appears near 2,140 cm$^{-1}$, is divided by the absorbance at the absorption peak of the CN group in potassium ferrocyanide, which appears near 2,100 cm$^{-1}$. To calculate the carbodiimide equivalent from thus value, a specimen with a known carbodiimide equivalent is examined in advance by IR measurement and a calibration curve is prepared based on the ratio between the absorbance at the peak attributed to the carbodiimide group and the absorbance at the peak of the internal reference. Then, the absorbance ratio of the hydroxyl-containing compound (e) is compared to the calibration curve to determine the carbodiimide equivalent. Useful samples of the specimen with a known carbodiimide equivalent include aliphatic polycarbodiimide (Carbodilite (registered trademark) LA-1, manufactured by Nisshinbo Industries, Inc., carbodiimide equivalent 247 g/mol), and aromatic polycarbodiimide (Stabaxol (registered trademark) P, manufactured by Rhein Chemie, carbodiimide equivalent 360 g/mol).

Specific examples of the compound containing an epoxy group include epichlorohydrin, glycidyl ether type epoxy resin, glycidyl ester type epoxy resin, glycidyl amine type epoxy resin, alicyclic epoxy resin, heterocyclic epoxy resin, and vinyl based polymers containing glycidyl groups. Two or more of these may be used in combination.

Examples of the glycidyl ether type epoxy resin include those produced from epichlorohydrin and bisphenol A, those produced from epichlorohydrin and bisphenol F, phenol novolac type epoxy resin produced by reacting novolac resin with epichlorohydrin, orthocresol novolac type epoxy resin, so-called brominated epoxy resin derived from epichlorohydrin and tetrabromobisphenol A, glycerol triglycidyl ether, trimethylolpropane triglycidyl ether, and pentaerythritolpolyglycidyl ether.

Examples of the glycidyl ester type epoxy resin include epoxy resin produced from epichlorohydrin together with phthalic acid, tetrahydrophthalic acid, p-oxybenzoic acid, or dimer acid, as well as triglycidyl trimesate, triglycidyl trimellitate, and tetraglycidyl pyromellitate.

Examples of the glycidyl amine type epoxy resin include epoxy resin produced from epichlorohydrin in combination with aniline, diaminodiphenyl methane, p-aminophenol, metaxylylene diamine, or 1,3-bis(aminomethyl) cyclohexane, as well as tetraglycidylaminodiphenyl methane, triglycidyl-para-aminophenol, triglycidyl-meta-aminophenol, tetraglycidyl-meta-xylene diamine, tetraglycidylbisaminomethyl cyclohexane, triglycidyl cyanurate, and triglycidyl isocyanurate.

Examples of the alicyclic epoxy resin include compounds having a cyclohexene oxide group, tricyclodecene oxide group, or cyclopentene oxide group.

Examples of the heterocyclic epoxy resin include epoxy resin produced from epichlorohydrin in combination with hydantoin or isocyanuric acid.

Examples of the vinyl based polymer containing a glycidyl group include polymers produced by radical polymerization of raw material monomers that form vinyl based units containing glycidyl groups. Specific examples of the raw material monomers that form vinyl based units containing glycidyl groups include glycidyl esters of unsaturated monocarboxylic acids such as glycidyl (meth)acrylate and glycidyl p-styrylcarboxylate; monoglycidyl esters of unsaturated polycarboxylic acids such as maleic acid and itaconic acid; and unsaturated glycidyl ethers such as polyglycidyl ester, allylglycidyl ether, 2-methylallylglycidyl ether, and styrene-4-glycidyl ether.

Commercially available compounds containing epoxy groups include polyglycidyl ether compounds that are low molecular weight polyfunctional epoxy compounds (for example, SR-TMP manufactured by Sakamoto Yakuhin Kogyo Co., Ltd., and Denacol (registered trademark) EX-521, manufactured by Nagase ChemteX Corporation; polyfunctional epoxy compounds containing polyethylene as primary component (for example, Bondfast (registered trademark) E, manufactured by Sumitomo Chemical Co., Ltd.); polyfunctional epoxy compounds containing an acrylic compound as primary component (for example, Rezeda (registered trademark) GP-301, manufactured by Toagosei Co., Ltd., ARUFON (registered trademark) UG-4000, manufactured by Toagosei Co., Ltd., and Metabrane (registered trademark) KP-7653, manufactured by Mitsubishi Rayon Co., Ltd.; polyfunctional epoxy compounds containing an acrylic-styrene copolymer as primary component (for example, Joncryl (registered trademark)-ADR-4368, manufactured by BASF, and ARUFON (registered trademark) UG-4040, manufactured by Toagosei Co., Ltd.); polyfunctional epoxy compounds containing a silicone-acrylic copolymer as primary component (for example, Metabrane (registered trademark) S-2200; polyfunctional epoxy compounds containing polyethylene glycol as primary component (for example, EPIOL (registered trademark) E-1000, manufactured by NOF Corporation), bisphenol A type epoxy resin (for example, jER (registered trademark) 1004, manufactured by Mitsubishi Chemical Corporation); and novolac phenol type modified epoxy resin (for example, EPPN (registered trademark) 201, manufactured by Nippon Kayaku Co., Ltd.).

Examples of the compound containing a carbodiimide group include dicarbodiimides such as N,N'-diisopropyl carbodiimide, N,N'-dicyclohexyl carbodiimide, and N,N'-di-2,6-diisopropylphenyl carbodiimide; and polycarbodiimides such as poly(1,6-hexamethylene carbodiimide), poly(4,4'-methylenebiscyclohexyl carbodiimide), poly(1,3-cyclohexylene carbodiimide), poly(1,4-cyclohexylene carbodiimide), poly(4,4'-dicyclohexylmethane carbodiimide), poly(4,4'-diphenylmethane carbodiimide), poly(3,3'-dimethyl-4,4'-diphenylmethane carbodiimide), poly(naphthalene carbodiimide), poly(p-phenylene carbodiimide), poly(m-phenylene carbodiimide), poly(tolylcarbodiimide), poly(diisopropyl carbodiimide), poly(methyl-diisopropylphenylene carbodiimide), poly(1,3,5-triisopropylbenzene) polycarbodiimide, poly(1,3,5-triisopropylbenzene) polycarbodiimide, poly(1,5-diisopropylbenzene) polycarbodiimide, poly(triethylphenylene carbodiimide), and poly(triisopropylphenylene carbodiimide).

Commercially available compounds containing carbodiimide groups include Carbodilite (registered trademark), manufactured by Nisshinbo Holdings Inc., and Stabaxol (registered trademark), manufactured by Rhein Chemie.

There are no specific limitations on the molecular weight of the compound containing an epoxy group and/or carbodiimide group, but it is preferably 800 to 10,000. If the compound containing an epoxy group and/or carbodiimide group has a molecular weight of 800 or more, it will not be volatilized in the melt-kneading step to ensure high processability. In addition, the viscosity in the melt-kneading step can be increased to enhance the compatibility between the polyamide resin (A) and the hydroxyl-containing compound (e) to ensure further improvement in mechanical characteristics, heat aging resistance, and press fitting property. The molecular weight of the compound containing an epoxy group and/or carbodiimide group is more preferably 1,000 or more. If the compound containing an epoxy group and/or carbodiimide group has a molecular weight of 10,000 or less, it will be possible to control the viscosity appropriately in the melt-kneading step to ensure high processability. It will also be possible to maintain a high compatibility between the polyamide resin (A) and the hydroxyl-containing compound (e). The molecular weight of the compound containing an epoxy group and/or carbodiimide group is more preferably 8,000 or less.

The molecular weight of the compound containing an epoxy group and/or carbodiimide group can be calculated on the basis of the structural formula of the compound determined by a common analysis method (for example, NMR, FT-IR, GC-MS, etc., used in combination). When the compound containing an epoxy group and/or carbodiimide group is a condensate, furthermore, the weight average molecular weight is used to represent its molecular weight. The weight average molecular weight (Mw) can be determined by gel permeation chromatography (GPC). Specifically, a solvent that dissolves the compound such as hexafluoroisopropanol, is used as mobile phase while polymethyl methacrylate (PMMA) is used as reference material. For the measurement of the weight average molecular weight, a column suited to the solvent to use (for example, Shodex GPC HFIP-806 M and/or Shodex GPC HFIP-LG, manufactured by Shimadzu GLC Ltd., are used when adopting hexafluoroisopropanol, and a differential refractometer is used as detector.

The compound containing an epoxy group and/or carbodiimide group is preferably a solid at 25° C. or a liquid having a viscosity of 200 mPa·s or more at 25° C. In that example, the viscosity in the melt-kneading step can be easily controlled as desired to enhance the compatibility between the polyamide resin (A) and the hydroxyl-containing compound (e) to ensure further improvement in mechanical characteristics, heat aging resistance, and press fitting property.

The quotient of the molecular weight divided by the number of functional groups in one molecule, which represents the functional group concentration in the compound containing an epoxy group and/or carbodiimide group, is preferably 50 to 2,000. The number of functional groups means the total number of epoxy groups and carbodiimide groups. A smaller quotient value means a higher functional group concentration, and a value of 50 or more serves to depress gelation due to excessive reaction and maintain a suitably high reactivity between the polyamide resin (A) and the hydroxyl-containing compound (e) to ensure further improvement in mechanical characteristics, heat aging resistance, and press fitting property. The quotient of the molecular weight of the compound containing an epoxy group and/or carbodiimide group divided by the number of functional groups in one molecule is more preferably 100 or more. On the other hand, if the quotient of the molecular weight of the compound containing an epoxy group and/or carbodiimide group divided by the number of functional groups in one molecule is 2,000 or less, it will be possible to realize a sufficient degree of reaction between the polyamide resin (A) and the hydroxyl-containing compound (e) to ensure further improvement in mechanical characteristics, heat aging resistance, and press fitting property. The quotient of the molecular weight of the compound containing an epoxy group and/or carbodiimide group divided by the number of functional groups in one molecule is more preferably 1,000 or less, still more preferably 300 or less.

The hydroxyl-containing compound (E) preferably has a hydroxyl value of 100 to 2,000 mgKOH/g (when a compound (e) containing at least three hydroxyl groups produced by reacting a compound containing hydroxyl groups with a compound containing an epoxy group and/or carbodiimide group is used as the hydroxyl-containing compound (E), this applies also to the compound containing hydroxyl groups used as raw material). If the hydroxyl-containing compound (E) has a hydroxyl value of 100 mgKOH/g or more, it will be easy to maintain a sufficient degree of reaction between the polyamide resin (A) and the hydroxyl-containing compound (E) to ensure further improvement in heat aging resistance. The hydroxyl-containing compound (E) more preferably has a hydroxyl value of 300 mgKOH/g or more. On the other hand, if the hydroxyl-containing compound (E) has a hydroxyl value of 2,000 mgKOH/g or less, an appropriately increased degree of reactivity can be realized between the polyamide resin (A) and the hydroxyl-containing compound (E) and, accordingly, gelation due to excessive reaction can be depressed to ensure further improvement in heat aging resistance. The hydroxyl-containing compound (E) more preferably has a hydroxyl value of 1,800 mgKOH/g or less. The hydroxyl value can be determined by acetylating the hydroxyl-containing compound (E) with a mixed solution of acetic anhydride and pyridine anhydride and titrating the resulting solution with an ethanolic potassium hydroxide solution.

The hydroxyl-containing compound (E) preferably, and each hydroxyl group as well, may have other reactive functional groups (when a compound (e) containing at least three hydroxyl groups produced by reacting a compound containing hydroxyl groups with a compound containing an epoxy group and/or carbodiimide group is used as the hydroxyl-containing compound (E), this applies also to the compound containing hydroxyl groups used as raw material). Examples of such other functional groups include aldehyde group, sulfo group, isocyanate group, oxazoline group, oxazine group, ester group, amide group, silanol group, and silyl ether group.

There are no specific limitations on the molecular weight of the hydroxyl-containing compound (E), but it is preferably 50 to 10,000 (a compound (e) containing at least three hydroxyl groups produced by reacting a compound containing hydroxyl groups with a compound containing an epoxy group and/or carbodiimide group is used as the hydroxyl-containing compound (E), this applies also to the compound containing hydroxyl groups used as raw material). If the hydroxyl-containing compound (E) has a molecular weight of 50 or more, it will not volatilize in the melt-kneading step and will be high in processability. The hydroxyl-containing compound (E) preferably has a molecular weight of 150 or more, more preferably 200 or more. On the other hand, if the molecular weight of the hydroxyl-containing compound (E) is 10,000 or less, its compatibility with the polyamide resin (A) will be higher to further enhance the effect of the present invention. The molecular weight of the hydroxyl-containing compound (E) is preferably 6,000 or less, more preferably 4,000 or less, and still more preferably 800 or less.

The molecular weight of the hydroxyl-containing compound (E) can be calculated on the basis of the structural formula of the compound determined by a common analysis method (for example, NMR, FT-IR, GC-MS and the like, used in combination). When the hydroxyl-containing compound (E) is a condensate, furthermore, the weight average molecular weight is used to represent its molecular weight. The weight average molecular weight (Mw) can be determined by gel permeation chromatography (GPC). Specifically, a solvent that dissolves the compound, such as hexafluoroisopropanol, is used as mobile phase while polymethyl methacrylate (PMMA) is used as reference material. For the measurement of the weight average molecular weight, a column suited to the solvent to use (for example, Shodex GPC HFIP-806 M and/or Shodex GPC HFIP-LG, manufactured by Shimadzu GLC Ltd., are used when adopting hexafluoroisopropanol, and a differential refractometer is used as detector.

There are no specific limitations on the degree of branching of the hydroxyl-containing compound (E) in an more preferred example, but it is preferably 0.05 to 0.70 (when a compound (e) containing at least three hydroxyl groups produced by reacting a compound containing hydroxyl groups with a compound containing an epoxy group and/or carbodiimide group is used as the hydroxyl-containing compound (E), this applies also to the compound containing hydroxyl groups used as raw material). The degree of branching represents the extent of branching in a compound, and the degree of branching is 0 for a straight-chain compound whereas the degree of branching is 1 for a fully branched dendrimer. A larger degree of branching means that a crosslinked structure can be introduced more easily into the polyamide resin composition to ensure further improvement in mechanical characteristics, heat aging resistance, and press fitting property. If the degree of branching is 0.05 or more, a crosslinked structure is formed fully in the polyamide resin composition to ensure a further improved compatibility with the polyamide resin (A), leading to further improvement in mechanical characteristics, heat aging resistance and press fitting property. The degree of branching is more preferably 0.10 or more. On the other hand, if the degree of branching is 0.70 or less, the cross-linked structure formation in the polyamide resin composition can be controlled moderately and the dispersibility of the hydroxyl-containing compound (E) in the polyamide resin composition can be further increased to ensure further improvement in mechanical characteristics, heat aging resistance, and press fitting property. The degree of branching is more preferably 0.35 or less. The degree of branching is defined by Equation (3)

$$\text{Degree of branching} = (D+T)/(D+T+L) \qquad (3)$$

In Equation (3), D is the number of dendric units; L is the number of linear units; and T is the number of terminal units. The values of D, T, and L can be calculated from the integrated values of peak shifts determined by $^{13}$C-NMR. D is attributed to the tertiary or quaternary carbon atoms; T is attributed to the primary carbon atoms contained in methyl groups; and L is attributed to the primary or secondary carbon atoms excluding T.

Examples of the hydroxyl-containing compound (E) having a degree of branching in the aforementioned range include, for example, those aforementioned preferred examples of the hydroxyl-containing compound (E) and reaction products of such compounds containing hydroxyl groups and compounds containing epoxy groups and/or carbodiimide groups.

According to a more preferred example, the hydroxyl-containing compound (E) is preferably a compound, and/or condensate thereof, having a structure as represented by general formula (4)

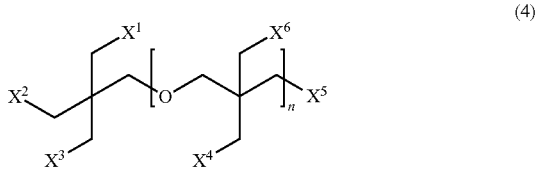

(4)

In general formula (4), $X^1$ to $X^6$ are either identical to or different from each other and each represents OH, $CH^3$, or OR. The sum of the numbers of OHs and ORs should be 3 or more, and the number of OHs should be 3 or more. Furthermore, R represents an organic group having an epoxy group or carbodiimide group and n is an integer in the range of 0 to 20.

In general formula (4), R is an organic group having an epoxy group or an organic group having a carbodiimide group. Examples of the organic group having an epoxy group include epoxy group, glycidyl group, glycidyl ether type epoxy group, glycidyl ester type epoxy group, glycidyl amine type epoxy group, hydrocarbon group substituted by epoxy group or glycidyl group, and heterocyclic group substituted by an epoxy group or glycidyl group. Examples of the organic group having a carbodiimide group include alkyl carbodiimide group, cycloalkyl carbodiimide group, and arylalkyl carbodiimide group.

In general formula (4), n is an integer of 0 to 20. The plasticization of the polyamide resin (A) is depressed to ensure further improvement in mechanical characteristics, heat aging resistance, and press fitting property. It is more preferable for n to be 4 or less. On the other hand, n is more preferably 1 or more because the molecular mobility of the hydroxyl-containing compound (E) can be increased and its compatibility with the polyamide resin (A) can be further improved.

The sum of the numbers of OHs and ORs in general formula (4) is preferably 3 or more. This leads to a high compatibility with the polyamide resin (A) and further improvement in mechanical characteristics, heat aging resistance, and press fitting property. In the case of a low molecular weight compound, the sum of the numbers of OHs and ORs can be calculated on the basis of the structural formula of the compound determined by a common analysis method (for example, NMR, FT-IR, GC-MS and the like, used in combination).

In a condensate, the number of OHs can be determined by calculating the number average molecular weight and the hydroxyl value of the compound having a structure as represented by general formula (4) and/or condensate thereof and making a calculation by Equation (5).

Number of OH groups=(number average molecular weight×hydroxyl value)/56110  (5)

In a condensate, the number of ORs can be determined by dividing the number average molecular weight of the compound having a structure as represented by general formula (4) and/or condensate thereof by the epoxy equivalent or the carbodiimide equivalent. The number average molecular weight of the compound having a structure as represented by general formula (4) and/or condensate thereof can be determined by gel permeation chromatography (GPC). Specifically, calculation can be performed by the following procedure. A solvent that dissolves the compound having a structure as represented by general formula (4) and/or condensate thereof, such as hexafluoroisopropanol, is used as mobile phase and polymethyl methacrylate (PMMA) is used as reference material. For the measurement of the number average molecular weight, a column suited to the solvent to use (for example, Shodex GPC HFIP-806 M and/or Shodex GPC HFIP-LG, manufactured by Shimadzu GLC Ltd., are used when adopting hexafluoroisopropanol hexafluoroisopropanol), and differential refractometer as detector. The epoxy equivalent and the carbodiimide equivalent can be determined by the method described above.

The hydroxyl-containing compound (E) preferably accounts for 0.1 to 20 parts by weight (0.1 parts by weight of or more and 20 parts by weight of or less) relative to 100 parts by weight of the polyamide resin (A). If the hydroxyl-containing compound (E) accounts for 0.1 parts by weight of or more, the flowability in the molding step is prevented from decreasing to ensure improvement in mechanical characteristics, heat aging resistance, and press fitting property. The hydroxyl-containing compound (E) more preferably accounts for 0.5 part by weight or more, still more preferably 2.5 parts by weight of or more, relative to 100 parts by weight of the polyamide resin (A). On the other hand, if the content of the hydroxyl-containing compound (E) is 20 parts by weight of or less, the dispersibility of the hydroxyl-containing compound (E) in the polyamide resin composition will improve and, accordingly, the plasticization and decomposition of the polyamide resin (A) will be depressed to ensure improvement in mechanical characteristics, heat aging resistance, and press fitting property. The hydroxyl-containing compound (E) more preferably accounts for 7.5 part by weight or less, still more preferably 6 parts by weight of or less, relative to 100 parts by weight of the polyamide resin (A).

When a compound (e) containing at least three hydroxyl groups produced by reacting a compound containing hydroxyl groups as described above with a compound containing an epoxy group and/or carbodiimide group is used as the hydroxyl-containing compound (E), there are no specific limitations on the production method to use, but a preferred procedure is to dry-blend a compound containing hydroxyl groups with a compound containing an epoxy group and/or carbodiimide group and melt-knead them at a temperature higher than the melting points of both components.

It is also preferred to add a catalyst to promote the reaction between the hydroxyl group and the epoxy group and/or the carbodiimide group. There are no specific limitations on the quantity of the catalyst to add, but it is preferably 0 to 1 part by weight, more preferably 0.01 to 0.3 part by weight, relative to the total quantity, which accounts for 100 parts by weight, of the compound containing hydroxyl groups and the compound containing an epoxy group and/or carbodiimide group.

Examples of the catalyst to promote the reaction between the hydroxyl group and the epoxy group include phosphines, imidazoles, amines, and diazabicyclo compounds. Specific example of the phosphines include triphenyl phosphine (TPP). Specific examples of imidazoles include 2-heptadecyl imidazole (HDI), 2-ethyl-4-methyl imidazole, 1-benzyl-2-methyl imidazole, and 1-isobutyl-2-methyl imidazole. Specific example of amines include N-hexadecyl morpholine (HDM), triethylene diamine, benzyldimethyl amine (BDMA), tributyl amine, diethyl amine, triethyl amine, 1,8-diazabicyclo(5,4,0)-undecene-7 (DBU), 1,5-diazabicyclo(4,3,0)-nonene-5 (DBN), tris-dimethylaminomethyl phenol, tetramethylethylene diamine, N,N-dimethylcyclohexyl amine, and 1,4-diazabicyclo-(2,2,2)-octane (DABCO).

Examples of the catalyst to promote the reaction between the hydroxyl group and the carbodiimide group include trialkyl lead alkoxide, fluoroboric acid, zinc chloride, and sodium alkoxide.

When the compound containing hydroxyl groups and the compound containing an epoxy group and/or carbodiimide group are melt-kneaded, the hydroxyl groups in the compound containing hydroxyl groups react with the epoxy group and/or carbodiimide group in the compound containing an epoxy group and/or carbodiimide group. In addition, dehydration-condensation reaction also occurs between molecules of the compound containing hydroxyl groups. Thus, a hydroxyl-containing compound (E) having a multibranched structure is obtained.

When the hydroxyl-containing compound (e) is produced by reacting a compound containing hydroxyl groups with a compound containing an epoxy group and/or carbodiimide group, there are no specific limitations on their compounding ratio, but it is preferred to mix these compounds so that the total number of hydroxyl groups in one molecule of the hydroxyl-containing compound (e) is larger than the total number of epoxy groups and carbodiimide groups in one molecule of the hydroxyl-containing compound (e) and/or condensate thereof. Compared to the hydroxyl group, epoxy groups and carbodiimide groups are higher in the reactivity with the end group of the polyamide resin (A). Accordingly, if the total number of hydroxyl groups in one molecule of the hydroxyl-containing compound (e) is larger than the total number of epoxy groups and carbodiimide groups in one molecule of the hydroxyl-containing compound (e), embrittlement due to the formation of a crosslinked structure to an excessive degree will be depressed to ensure further improvement in mechanical characteristics, heat aging resistance, and press fitting property.

In addition, the weight ratio of the reactant compound containing an epoxy group and/or carbodiimide group to the compound containing hydroxyl groups ((compound containing epoxy group and/or carbodiimide group)/(compound containing hydroxyl groups)) is preferably 0.3 or more and less than 10,000.

The reactivity between the polyamide resin (A) and the compound containing an epoxy group and/or carbodiimide group and the reactivity between the compound containing hydroxyl groups and the compound containing an epoxy group and/or carbodiimide group are higher than the reactivity between the polyamide resin (A) and the hydroxyl-containing compound (E). Accordingly, if the aforementioned weight ratio is 0.3 or more, gel formation due to excessive reaction can be depressed to ensure further improvement in mechanical characteristics, heat aging resistance, and press fitting property.

When the hydroxyl-containing compound (E) is produced by reacting a compound containing hydroxyl groups with a compound containing an epoxy group and/or carbodiimide group, the reaction rate between the hydroxyl group and the epoxy group or carbodiimide group is preferably 1% to 95%. A reaction rate of 1% or more ensures a higher degree of branching and a smaller autoagglutination tendency in the hydroxyl-containing compound (E), a higher reactivity with the polyamide resin (A), and further improvement in heat aging resistance. The reactivity is more preferably 10% or more, still more preferably 20% or more. On the other hand, a reaction rate of 95% or less allows an appropriate amount of epoxy groups or carbodiimide groups to remain to ensure a higher reactivity with the polyamide resin (A). The reactivity is more preferably 90% or less, still more preferably 70% or less.

To determine the reaction rate between hydroxyl groups and epoxy groups and/or carbodiimide groups, the hydroxyl-containing compound (E) resulting from the reaction is dissolved first in a solvent (for example, deuterated dimethylsulfoxide, deuterated hexafluoroisopropanol, etc.). In epoxy groups, the peak attributed to the epoxy ring observed by $^1$H-NMR analysis is examined to calculate the decrease between before and after the reaction with the compound containing hydroxyl groups used as raw material, whereas in the case of carbodiimide groups, the peak attributed to the carbodiimide group observed by $^{13}$C-NMR analysis is examined to calculate the decrease between before and after the reaction with compound containing hydroxyl groups used as raw material. The reaction rate can be determined by Equation (6)

$$\text{Reaction rate } (\%) = \{1-(e/d)\} \times 100 \tag{6}$$

In Equation (6), d is the peak area of a dry-blended mixture of the compound containing hydroxyl groups used as raw material and the compound containing an epoxy group and/or carbodiimide group, and e is the peak area of the hydroxyl-containing compound (E) resulting from the reaction.

The polyamide resin composition may further contain a filler unless it impairs the advantageous effects of the present invention. Examples of the filler include fibrous, plate-like, powdery, or particulate fillers. More specifically, they include glass fiber, PAN based or pitch based carbon fiber, metal fibers such as stainless steel fiber, aluminum fiber, and brass fiber, organic fibers such as aromatic polyamide fiber and liquid crystalline polyester fibers, fibrous or whisker-like fillers such as gypsum fiber, ceramic fiber, asbestos fiber, zirconia fiber, alumina fiber, silica fiber, titanium oxide fiber, silicon carbide fiber, rock wool, potassium titanate whisker, titanium acid barium whisker, aluminum borate whisker, nitride silicon whisker, and needle-like titanium oxide, and powdery, particulate, or plate-like fillers such as mica, talc, kaolin, silica, glass beads, glass flake, clay, molybdenum disulfide, wollastonite, titanium oxide, zinc oxide, polycalcium phosphate, and graphite. The aforementioned fillers may have surfaces treated with generally known coupling agents (for example, silane based coupling agent, titanate based coupling agent and the like) or other surface treatment agents.

Of these fillers, glass fiber is particularly preferable. There are no specific limitations on the type of glass fiber to use as long as they serve generally for reinforcement of resin, and good examples include long fiber type and short fiber type chopped strands and milled fibers. The glass fiber to use for the present invention is preferably weakly alkaline from the viewpoint of mechanical strength. In particular, glass fiber with a silicon oxide content of 50 wt % to 80 wt % is preferable, and glass fiber with a silicon oxide content of 65 wt % to 77 wt % is more preferable. Furthermore, the glass fiber is preferably treated with epoxy based, urethane based, or acrylic cladding or convergence agents, of which epoxy based ones are particularly preferable. It is also preferable for the fiber to be treated with silane based or titanate based coupling agents or other surface treatment agents, particularly preferably with epoxy silane or aminosilane based coupling agents. Here, the glass fiber may be cladded or bundled by thermoplastic resin such as ethylene/vinyl acetate copolymers or thermosetting resin such as epoxy resin. A plurality of the above fillers may be used in combination.

The filler present in the polyamide resin composition preferably accounts for 1 to 150 parts by weight relative to 100 parts by weight of the polyamide resin. If the filler accounts for 1 part by weight or more, mechanical characteristics will improve. It is preferably 10 parts by weight or more and more preferably 20 parts by weight or more. If the filler accounts for 150 part by weight or less, mechanical characteristics and flowability will not deteriorate easily. It is preferably 100 parts by weight or less and more preferably 70 parts by weight or less.

The polyamide resin composition may further include common additives selected from the following unless they impair the advantageous effects: antioxidants, thermal stabilizers (for example, hindered phenol, hydroquinone, phosphites, and substitution products thereof), ultraviolet absorbers (for example, resorcinol and salicylate), color protection agents such as phosphites and hypophosphites, lubricants/mold releasing agents (montanic acid, metal salts thereof, esters thereof, half esters thereof, stearyl alcohols, stearamide, polyethylene wax, etc.), coloring agents such as dyes and pigments, carbon black as electrically conductive material or coloring agent, crystal nucleating agents, plasticizers, and antistatic agents. Or, a polymer other than polyamide resin may be added to develop required characteristics.

There are no specific limitations on the methods to use to add the fire retardant (B), the metal and/or salt thereof (C), and the compound (D) to the polyamide resin (A), and useful ones include dry-blending, solution formulation, addition during polymerization of the polyamide resin (A), and melt-kneading, of which melt-kneading is preferable. Generally known methods may be used for the melt-kneading step. For example, an appropriate tool such as Banbury mixer, rubber roll, kneader, and uniaxial or twin screw extruder is used to perform melt-kneading at a temperature not lower than the melting point of the polyamide resin (A) and not higher than [the melting point+50° C.] to produce a resin composition. Of these tools, the use of a twin screw extruder is preferred.

Examples of good kneading methods include: 1) the polyamide resin (A), fire retardant (B), metal and/or salt thereof (C), a compound (D) with a specific structure, and other additives are fed together from a material feeder and kneaded (batch kneading method), 2) the metal and/or salt thereof (C) and the compound (D) with a specific structure are mixed to prepare a complex compound, and then the complex compound is kneaded with the polyamide resin (A), the fire retardant (B), and other additives fed together from a material feeder (complex addition method), 3) the polyamide resin (A), fire retardant (B), metal and/or salt thereof (C), compound (D) with a specific structure, and other additive are fed from the material feeder and kneaded, and then fillers and other additives as required are added from the side feeder, followed by kneading (side feeding method), and 4) a highly concentrated thermoplastic resin composition (master pellets) containing [the polyamide resin (A), metal and/or salt thereof (C), and compound (D) with a specific structure], or [the polyamide resin (A), compound (E) containing at least three hydroxyl groups, and other additives] is prepared and then the master pellets are kneaded with the polyamide resin (A), fire retardant (B), and other additives and fillers such that a required concentration is reached (master pellet method). Any of the methods can work appropriately, but among others, method 1) batch kneading and method 3) side feeding are preferred because the metal and/or salt thereof (C) and the compound (D) with a specific structure can be added separately to ensure further improvement in heat aging resistance, flowability, and press fitting property. The mechanism of the characteristics improvement has not been clarified yet, but it is believed that the mixed addition of the metal and/or salt thereof (C) and the compound (D) with a specific structure, compared to their addition as a complex compound more effectively increases the activity and dispersibility, ensures larger improvement in the diffusion rate of the metal and/or salt thereof (C) in the polyamide resin (A), and ensures a larger improvement in the radical-scavenging ability of the metal and/or salt thereof (C).

The polyamide resin composition thus obtained can be processed by generally known melt moldings such as injection molding, injection compression molding, compression molding, extrusion molding, blow molding, and press molding to provide molded articles having excellent mechanical characteristics, heat aging resistance, flowability, fire retardancy, and press fitting property. Examples of the molded articles referred to above include injection-molded articles, extrusion-molded articles, press-molded articles, sheets, pipes, unstretched films, uniaxially stretched films, biaxially stretched films, other various films, unstretched yarns, ultra-drawn yarns, and other various fibers. In particular, the desired effects are realized significantly when it is applied to injection molding.

Having excellent characteristics, the polyamide resin composition and molded articles thereof are useful for production of various articles including automobile components, electric/electronic components, construction members, various containers, daily commodities, daily sundry goods, and sanitary articles. The polyamide resin composition and molded articles thereof are particularly preferred as materials for components that require excellent mechanical characteristics, heat aging resistance, fire retardancy, and press fitting property, such as automobile components used around the engine, automobile underhood components, automobile gear components, automobile interior finishing components, automobile exterior components, air-intake and exhaust related components, engine cooling water related components, automobile electrical equipment components, and electric/electronic components. More specifically, the polyamide resin composition and molded articles thereof can be applied preferably to automobile components used around the engine such as engine cover, air intake pipe, timing belt cover, intake manifold, filler cap, throttle body, and cooling fan; automobile underhood components such as cooling fan, top/base of radiator tank, cylinder head cover, oil pan, brake piping, tube for fuel piping, and waste gas line components; automobile gear components such as gear, actuator, bearing retainer, bearing gauge, chain guide, and chain tensioner; automobile interior finishing components such as shift lever bracket, steering lockbracket, key cylinder, door's inner handle, door handle cowl, room mirror bracket, air conditioner switch, instrumental panel, console box, glove box, steering wheel, and trim; automobile exterior components such as front fender, rear fender, fuel lid, door panel, cylinder head cover, door mirror stay, tail gate panel, license garnish, roof rail, engine mounting bracket, rear garnish, rear spoiler, trunk lid, rocker molding, molding, lamp housing, front grill, mud guard, and side bumper; air-intake and exhaust related components such as air intake manifold, intercooler inlet, turbocharger, exhaust pipe cover, inner wear bush, bearing retainer, engine mount, engine head cover, resonator, and throttle body; engine cooling water related components such as chain cover, thermostat housing, outlet pipe, radiator tank, alternator, and delivery pipe; automobile electrical equipment components such as connector and wire harness connector, motor components, lamp socket, sensor onboard switch, and combination switch; and electric/electronic components including electric components such as power generator, electric motor, potential transformer, current transformer, voltage regulator, rectifier, resistor, inverter, relay, contact for electric power, switch, shutoff device, switch, knife switch, multipolar rod, motor case, notebook computer housing/internal components, CRT display housing/internal components, printer housing/internal components, portable telephone, mobile personal computer, handheld type mobile and other portable device housing/internal components, housing for IC/LED device, capacitor seat plate, fuse holder, various gear, various cases, and cabinet; electronic components such as connector, connector for SMT, card connector, jack, coil, coil bobbin, sensor, LED lamp, socket, resistor, relay, relay case, reflector, small switch, power source components, coil bobbin, capacitor, variable capacitor case, optical pickup chassis, oscillator, various terminal plates, transformer, plug, printed circuit board, tuner, speaker, microphone, headphone, small motor, magnetic head base, power module, Si power module/SiC power module, semiconductor, liquid crystal, FDD carriage, FDD chassis, motor brush holder, transformer member, parabolic antenna, and computer related components; and others such as clip, clump, band, and other components for connecting and bundling wires, codes, tubes, and various components.

EXAMPLES

Our compositions, mold articles and methods will now be illustrated in detail below with reference to Examples, but it should be understood that this disclosure is not construed as being limited to the Examples.

The polyamide resin (A), fire retardant (B), metal and/or salt thereof (C), compound (D), and other additive used in Examples and Comparative Examples are as described below.
Polyamide resin (A)
(A-1): nylon 6 resin (Amilan (registered trademark) CM1017, manufactured by Toray Industries, Inc.) with a melting point of 225° C. To determine the melting point of the polyamide resin (A-1), a specimen was heated from 30° C. at a rate of 10° C./min while measuring the heat quantity according to JIS K 7121 (1987) using a differential scanning calorimeter (Robot DSC, EXSTAR DSC6000 System, manufactured by Seiko Instruments Inc), and the melting point (Tm) was calculated from the melting endothermic peak temperature in the DSC curve.
(A-2): nylon 66 resin (Amilan (registered trademark) CM3001-N, manufactured by Toray Industries, Inc.) with a melting point of 260° C. The melting point of the polyamide resin (A-2) was determined by the same procedure as used for (A-1).
Flame Retardant (B)
(B-1): melamine cyanurate (MC-6000, manufactured by Nissan Chemical Industries, Ltd., average particle diameter 2 μm)
(B-2): melamine cyanurate (MC-4000, manufactured by Nissan Chemical Industries, Ltd., average particle diameter 14 μm)
(B-3): polymelamine phosphate (PHOSMEL-200, manufactured by Nissan Chemical Industries, Ltd., average particle diameter 5 μm or less)
(B-4): brominated polystyrene (SAYTEX HP-7010 G, manufactured by Albemarle Corporation)
(B-5): antimony trioxide (KSS-1000, manufactured by Nihon Seiko Co., Ltd.) Metal and/or salt thereof (C)
(C-1): copper iodide (I) (manufactured by Kanto Chemical Co., Inc.)
(C-2) lithium chloride (manufactured by Sigma-Aldrich) Ring-containing compound (D)
(D-1): 2-mercaptobenzoimidazole (manufactured by Tokyo Chemical Industry Co., Ltd.)
(D-2): 2-mercaptobenzothiazole (manufactured by Tokyo Chemical Industry Co., Ltd.)
(D-3): 2-aminobenzoimidazole (manufactured by Tokyo Chemical Industry Co., Ltd.) Compound (E) containing hydroxyl groups
(E-1): high concentration preliminary mixture First, 33.3 parts by weight of bisphenol A type epoxy resin (jER (registered trademark) 1004, manufactured by Mitsubishi Chemical Corporation, two epoxy groups in one molecule, molecular weight 1650, molecular weight/number of functional groups in one molecule=825) was mixed preliminarily with 100 parts by weight of dipentaerythritol (manufactured by Koei Chemical Co., Ltd.), and the mixture was melt-kneaded for 3.5 minutes in a twin screw extruder (PCM 30, manufactured by Ikegai Corp.) under the conditions of a cylinder temperature of 200° C. and a screw rotating speed of 100 rpm and pelletized by a hot cutter. The resulting pellets were supplied again to the extruder and subjected to the melt-kneading step once to provide pellets (E') of a compound as represented by general formula (4) and/or a condensate thereof. The resulting compound had a reaction rate of 56%, a degree of branching of 0.34, and a hydroxyl value of 1,200 mgKOH/g. One molecule contains 5.4 hydroxyl groups, which is larger than the number of epoxy groups contained in one molecule, and the OH and OR groups in general formula (4) totaled 3 or more. Next, 100 parts by weight of pellets (E') of the compound containing hydroxyl groups obtained above was mixed preliminarily with 100 parts by weight of nylon 6 (Amilan (registered trademark) CM1010, manufactured by Toray Industries, Inc.) and the mixture was melt-kneaded by a twin screw extruder (TEX 30 (L/D=45.5), manufactured by The Japan Steel Works, Ltd.) under the conditions of a cylinder temperature of 240° C. and a screw rotating speed of 150 rpm and pelletized by a strand cutter. Subsequently, vacuum-drying was performed at 80° C. for 8 hours to provide a high concentration preliminary mixture of a compound containing hydroxyl groups.

Examples 1 to 10 and 12 to 20 and Comparative Examples 1 to 9

A TEX 30 twin screw extruder (L/D=45) manufactured by The Japan Steel Works, Ltd. was set up to a temperature of 20° C. above the melting point of the polyamide resin (A) specified in the Tables and a screw rotating speed of 200 rpm, and materials of the polyamide resin (A), fire retardant (B), metal and/or salt thereof (C), compound (D), and other required additives, as specified in the Tables, were supplied to the twin screw extruder from the main feeder and melt-kneaded. The strand discharged from the die was cooled in water and pelletized by cutting it with a strand cutter to a length of 3.0 mm to provide polyamide resin composition pellets. The resulting polyamide resin composition pellets were vacuum-dried at 80° C. for 24 hours and evaluated as described below. Results are shown in Tables 1-1, 1-2, and 2.

Example 11

In 1 L of acetone at room temperature, 11.43 g (0.06 moles) of iodide copper (I) (C-1) used as the metal and/or salt thereof (C) and 9.01 g (0.06 moles) of 2-mercaptobenzoimidazole (D-1) used as the compound (D) were stirred until the iodide copper (I) was dissolved to prepare a light yellow uniform solution. Then, part of the remaining insoluble material was separated by filtering and acetone was removed to provide an equimolar complex compound of iodide copper (I) and 2-mercaptobenzoimidazole. Next, a TEX 30 twin screw extruder (L/D=45) manufactured by The Japan Steel Works, Ltd. was set up to a temperature of 20° C. above the melting point of the polyamide resin (A) specified in the Tables and a screw rotating speed of 200 rpm, and materials of the polyamide resin (A), fire retardant (B), aforementioned complex compound, and other required additives were supplied to the twin screw extruder from the main feeder in such a manner that they would account for the contents specified in Tables, and melt-kneaded. The strand discharged from the die was cooled in water and pelletized by cutting it with a strand cutter to a length of 3.0 mm to provide polyamide resin composition pellets. The resulting polyamide resin composition pellets were vacuum-dried at 80° C. for 24 hours and evaluated as described below. Results are shown in Table 1-2.

(1) Heat Aging Resistance Test (Retained Tensile Elongation Rate)

From the pellets, an ASTM No. 4 dumbbell specimen was injection-molded from an injection molding machine (SG75H-DUZ, manufactured by Sumitomo Heavy Industries, Ltd.) under the conditions of a cylinder temperature of 15° C. above the melting point of the polyamide resin (A), a mold temperature of 80° C., injection/cooling periods of 10/15 seconds, a screw rotating speed of 150 rpm, an injection pressure of 100 MPa, and an injection speed of 50 mm/seconds. This test piece was subjected to tensile test using a tensile tester (Tensilon Tester UTA2.5T, manufactured by Orientec Co., Ltd.) according to ASTM D638. Three measurements were taken and their average was calculated to represent the tensile elongation.

Furthermore, the ASTM No. 4 dumbbell specimen prepared for the tensile test was subjected to heat treatment (heat aging resistance treatment) in an atmosphere at 125° C. for 125 hours and the treated test piece was subjected to the same tensile test as above. Three measurements were taken and their average was calculated to represent the tensile elongation after heat aging resistance treatment. The ratio of the tensile elongation measured after the heat aging resistance treatment to the tensile elongation measured before the treatment was calculated to represent the retained tensile elongation rate. A larger retained tensile elongation rate means a better heat aging resistance.

(2) Heat Aging Resistance Test (Color Tone Change ΔE* Caused by Heat Treatment)

From the pellets, a 70 mm×70 mm×2 mm (thickness) square plate (film gate) was injection-molded from an injection molding machine (SG75H-DUZ, manufactured by Sumitomo Heavy Industries, Ltd.) under the conditions of a cylinder temperature of 15° C. above the melting point of the polyamide resin (A), a mold temperature of 80° C., injection/cooling periods of 10/15 seconds, a screw rotating speed of 150 rpm, an injection pressure of 100 MPa, and an injection speed of 50 mm/seconds. At appropriately selected five positions on the resulting square plate, L* (lightness), a*, and b* (hue and chroma) were measured using a color computer (SM Color Computer, model SM-3, manufactured by Suga Test Instruments Co., Ltd.) under the conditions of 23° C. and 50% RH and their average was calculated. In addition, the resulting 2 mm thick square plate was heat-treated for 2 hours in a gear oven in an atmosphere 190° C., and L*, a*, and b* were measured as described above at appropriately selected five positions under the conditions of 23° C. and 50% RH, followed by calculating their average. The average obtained was used to calculate the color tone change ΔE* by the equation:

$$\Delta E^* = [(\Delta L^*)^2 + (\Delta a^*)^2 + (\Delta b^*)^2]^{1/2}$$

Here, $\Delta L^* = L^*_{after\ heat\ treatment} - L^*_{before\ heat\ treatment}$, $\Delta a^* = a^*_{after\ heat\ treatment} - a^*_{before\ heat\ treatment}$, $\Delta b^* = b^*_{after\ heat\ treatment} - b^*_{before\ heat\ treatment}$.

(3) Flowability

From the pellets, 10 mm (width)×0.5 mm (thickness) bar flow test pieces were prepared by injection molding using an injection molding machine (SG75H-DUZ, manufactured by Sumitomo Heavy Industries, Ltd.) with a 200 mm (length)× 10 mm (width)×0.5 mm (thickness) mold under the conditions of a cylinder temperature of 15° C. above the melting point of the polyamide resin (A), a mold temperature of 80° C., injection/cooling periods of 10/15 seconds, a screw rotating speed of 150 rpm, an injection pressure of 100 MPa, and an injection speed of 50 mm/seconds. For each of five test pieces, the bar flow length at a dwell pressure of 0 was measured and the average was calculated for flowability evaluation. A longer bar flow length means a higher flowability.

(4) Press Fitting Property

Figure 2:
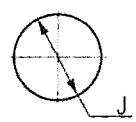
FIG. 2 schematically shows a mounting hole in a stainless steel plate for attaching a canoe clip used for product evaluation in Examples.

From the pellets, 30 specimens of the molded canoe clip illustrated in FIG. 1 were produced by injection molding using an injection molding machine (SG75H-DUZ, manufactured by Sumitomo Heavy Industries, Ltd.) under the conditions of a cylinder temperature of 15° C. above the melting point of the polyamide resin (A) and a mold temperature of 80° C. FIG. 1 shows a cross section of the canoe clip, and FIG. 2 schematically shows a mounting hole in a stainless steel plate for attaching the canoe clip. The canoe clip shown in FIG. 1 has dimensional features as described below. A: 7.5 mm (diameter), B: 3.0 mm, C: 4.0 mm, D: 11 mm, E: 1.5 mm, F: 4.8 mm, G: 3.4 mm, H: 3.5 mm, and I: 0.8 mm. The mounting hole shown in FIG. 2 has a diameter J of 3.5 mm Each of the molded canoe clips obtained above and the stainless steel plate designed for mounting them (hole diameter J: 3.5 mm) were cooled for 3 hours in a temperature controlled bath maintained at −30° C. Here, the temperature controlled bath used was a prefabricated type environment test facility (ROOMY, manufactured by AETEC Co., Ltd.) that can accommodate a tester to perform testing inside. A tester entered the bath after the 3 hour cooling and stayed in the temperature controlled bath for 10 minute stand-by to minimize his/her influence on the temperature that can occur due to his/her entry, followed by performing the operation of inserting the canoe clip into the mounting stainless steel plate. This operation was repeated for the 30 molded canoe clips to determine the number of cracked ones.

(5) Fire Retardancy

From the pellets, a 1/64 inch (about 0.38 mm) thick combustion test piece was injection-molded from an injection molding machine (SG75H-DUZ, manufactured by Sumitomo Heavy Industries, Ltd.) under the conditions of a cylinder temperature of 15° C. above the melting point of the polyamide resin (A), a mold temperature of 80° C., injection/cooling periods of 10/15 seconds, a screw rotating speed of 150 rpm, an injection pressure of 100 MPa, and an injection speed of 50 mm/seconds. This test piece was subjected to vertical flame test according to UL94. The fire retardancy level decreases in the order of V-0>V-1>V-2>HB.

(6) [N]/[M]

The pellets were dried at 80° C. for 12 hours. The pellets were incinerated in an electric furnace at 550° C. for 24 hours, and after adding concentrated sulfuric acid, the resulting ash was heated to cause wet decomposition, followed by diluting the solution of decomposed ash. The diluted solution was examined by atomic absorption spectroscopy (calibration curve method) to determine the copper content in the composition. Elsewhere, the dried pellets were subjected to reflux extraction treatment with a tenfold quantity of acetone at 60° C. for 4 hours. After the extraction step, the acetone solution was cooled and recovered, and acetone is evaporated by an evaporator to achieve solidification, thereby obtaining an extract. Then, the resulting extract and a reference material (ethyl benzene) for quantitative analysis were dissolved in a solvent, and the number of moles [N] of the compound (D) was determined from the ratio between the peak intensity attributed to the compound (D) and the peak intensity of the reference material measured by 1H-NMR. In Tables, "-" means that evaluation was not performed in the relevant Example.

TABLE 1

| | | | Example 1 | Example 2 | Example 3 | Example 4 | Example 5 |
|---|---|---|---|---|---|---|---|
| (A) Polyamide resin | (A-1) nylon 6 | parts by weight | 100 | | | | |
| | (A-1) nylon 66 | parts by weight | | 100 | 100 | 100 | 100 |
| (B) Fire retardant | (B-1) melamine cyanurate 2 μm | parts by weight | 5.5 | 5.5 | — | — | 1.2 |
| | (B-2) melamine cyanurate 14 μm | parts by weight | — | — | 5.5 | — | — |
| | (B-3) polymelamine phosphate | | — | — | — | 5.5 | — |
| | (B-4) brominated polystyrene | parts by weight | — | — | — | — | — |
| | (B-5) antimony trioxide | parts by weight | — | — | — | — | — |
| (C) Metal and/or salt thereof | (C-1) iodide copper | parts by weight | 0.045 | 0.045 | 0.045 | 0.045 | 0.045 |
| | (C-2) lithium chloride | parts by weight | — | — | — | — | — |
| (D) Ring-containing compound | (D-1) 2-mercaptobenzoimidazole | parts by weight | 0.035 | 0.035 | 0.035 | 0.035 | 0.035 |
| | (D-2) 2-mercaptobenzothiazole | parts by weight | — | — | — | — | — |
| | (D-3) 2-aminobenzoimidazole | parts by weight | — | — | — | — | — |
| (E) Hydroxyl-containing compound | (E-1) high concentration preliminary mixture | parts by weight | — | — | — | — | — |
| Heat aging resistance | retained tensile elongation rate after 125° C. × 125 hr treatment | % | 70 | 75 | 70 | 70 | 80 |
| | color tone change ΔE* in 190° C. × 2 hr treatment | — | 25 | 20 | 21 | 22 | 18 |
| Flowability | 0.5 mm-thick bar flow length | mm | 75 | 70 | 70 | 70 | 75 |
| Press fitting property | number of cracked ones out of 30 specimens | number | 0 | 0 | 4 | 5 | 0 |
| Fire retardancy | 0.38 mm according to UL94 | — | V-2 | V-0 | V-0 | V-1 | V-0 |
| | [N]/[M] | — | — | 0.19 | — | — | — |

| | | | Example 6 | Example 7 | Example 8 | Example 9 | Example 10 |
|---|---|---|---|---|---|---|---|
| (A) Polyamide resin | (A-1) nylon 6 | parts by weight | | | | | |
| | (A-1) nylon 66 | parts by weight | 100 | 100 | 100 | 100 | 100 |
| (B) Fire retardant | (B-1) melamine cyanurate 2 μm | parts by weight | 30.0 | — | 5.5 | 5.5 | 5.5 |
| | (B-2) melamine cyanurate 14 μm | parts by weight | — | — | — | — | — |
| | (B-3) polymelamine phosphate | | — | — | — | — | — |
| | (B-4) brominated polystyrene | parts by weight | — | 16.0 | — | — | — |
| | (B-5) antimony trioxide | parts by weight | — | 6.0 | — | — | — |
| (C) Metal and/or salt thereof | (C-1) iodide copper | parts by weight | 0.045 | 0.045 | 0.045 | 0.045 | 0.045 |
| | (C-2) lithium chloride | parts by weight | — | — | 0.150 | — | — |

TABLE 1-continued

| | | | | | | | |
|---|---|---|---|---|---|---|---|
| (D) Ring-containing compound | (D-1) 2-mercaptobenzoimidazole | parts by weight | 0.035 | 0.035 | 0.035 | — | — |
| | (D-2) 2-mercaptobenzothiazole | parts by weight | — | — | — | 0.035 | — |
| | (D-3) 2-aminobenzoimidazole | parts by weight | — | — | — | — | 0.035 |
| (E) Hydroxyl-containing compound | (E-1) high concentration preliminary mixture | parts by weight | — | — | — | — | — |
| Heat aging resistance | retained tensile elongation rate after 125° C. × 125 hr treatment | % | 60 | 70 | 85 | 75 | 75 |
| | color tone change ΔE* in 190° C. × 2 hr treatment | — | 23 | 25 | 17 | 21 | 24 |
| Flowability | 0.5 mm-thick bar flow length | mm | 60 | 60 | 75 | 70 | 75 |
| Press fitting property | number of cracked ones out of 30 specimens | number | 5 | 2 | 0 | 1 | 3 |
| Fire retardancy | 0.38 mm according to UL94 | — | V-0 | V-0 | V-0 | V-0 | V-0 |
| | [N]/[M] | — | — | — | — | — | — |

| | | | Example 11 | Example 12 | Example 13 | Example 14 | Example 15 |
|---|---|---|---|---|---|---|---|
| (A) Polyamide resin | (A-1) nylon 6 | parts by weight | | | | | |
| | (A-1) nylon 66 | parts by weight | 100 | 100 | 100 | 100 | 100 |
| (B) Fire retardant | (B-1) melamine cyanurate 2 μm | parts by weight | 5.5 | 5.5 | 5.5 | 5.5 | 5.5 |
| | (B-2) melamine cyanurate 14 μm | parts by weight | — | — | — | — | — |
| | (B-3) brominated polystyrene | parts by weight | — | — | — | — | — |
| | (B-4) antimony trioxide | parts by weight | — | — | — | — | — |
| (C) Metal and/or salt thereof | (C-1) iodide copper | parts by weight | 0.045 | 0.023 | 0.090 | 0.045 | 0.045 |
| | (C-2) lithium chloride | parts by weight | — | — | — | — | — |
| (D) Ring-containing compound | (D-1) 2-mercaptobenzoimidazole | parts by weight | 0.035 | 0.018 | 0.070 | 0.070 | 0.140 |
| | (D-2) 2-mercaptobenzothiazole | parts by weight | — | — | — | — | — |
| (E) Hydroxyl-containing compound | (E-1) high concentration preliminary mixture | parts by weight | — | — | — | — | — |
| Heat aging resistance | retained tensile elongation rate after 125° C. × 125 hr treatment | % | 60 | 70 | 80 | 80 | 65 |
| | color tone change ΔE* in 190° C. × 2 hr treatment | — | 25 | 23 | 17 | 16 | 25 |
| Flowability | 0.5 mm-thick bar flow length | mm | 65 | 70 | 70 | 75 | 80 |
| Press fitting property | number of cracked ones out of 30 specimens | number | 4 | 0 | 2 | 0 | 5 |
| Fire retardancy | 0.38 mm according to UL94 | — | V-0 | V-0 | V-0 | V-0 | V-1 |
| | [N]/[M] | — | 0.05 | — | — | 0.52 | 1.86 |

| | | | Example 16 | Example 17 | Example 18 | Example 19 | Example 20 |
|---|---|---|---|---|---|---|---|
| (A) Polyamide resin | (A-1) nylon 6 | parts by weight | | | | | |
| | (A-1) nylon 66 | parts by weight | 100 | 100 | 100 | 100 | 100 |
| (B) Fire retardant | (B-1) melamine cyanurate 2 μm | parts by weight | 5.5 | 5.5 | 5.5 | 1.2 | 1.2 |

TABLE 1-continued

|  |  |  |  |  |  |  |  |
|---|---|---|---|---|---|---|---|
|  | (B-2) melamine cyanurate 14 μm | parts by weight | — | — | — | — | — |
|  | (B-3) brominated polystyrene | parts by weight | — | — | — | — | — |
|  | (B-4) antimony trioxide | parts by weight | — | — | — | — | — |
| (C) Metal and/or salt thereof | (C-1) iodide copper | parts by weight | 0.045 | 0.090 | 0.045 | 0.045 | 0.045 |
|  | (C-2) lithium chloride | parts by weight | — | — | — | — | 0.150 |
| (D) Ring-containing compound | (D-1) 2-mercaptobenzoimidazole | parts by weight | 0.175 | 0.035 | 0.035 | 0.035 | 0.035 |
|  | (D-2) 2-mercaptobenzothiazole | parts by weight | — | — | — | — | — |
| (E) Hydroxyl-containing compound | (E-1) high concentration preliminary mixture | parts by weight | — | — | 4.4 | 2.2 | 2.2 |
| Heat aging resistance | retained tensile elongation rate after 125° C. × 125 hr treatment | % | 60 | 70 | 85 | 90 | 95 |
|  | color tone change ΔE* in 190° C. × 2 hr treatment | — | 28 | 17 | 13 | 13 | 11 |
| Flowability | 0.5 mm-thick bar flow length | mm | 85 | 70 | 85 | 80 | 85 |
| Press fitting property | number of cracked ones out of 30 specimens | number | 8 | 2 | 0 | 0 | 0 |
| Fire retardancy | 0.38 mm according to UL94 | — | V-2 | V-2 | V-0 | V-0 | V-0 |
|  | [N]/[M] | — | 2.80 | 0.11 | — | — | — |

TABLE 2

|  |  |  | Comparative example 1 | Comparative example 2 | Comparative example 3 | Comparative example 4 | Comparative example 5 |
|---|---|---|---|---|---|---|---|
| (A) polyamide resin | (A-1) nylon 6 | parts by weight |  |  |  |  |  |
|  | (A-1) nylon 66 | parts by weight | 100 | 100 | 100 | 100 | 100 |
| (B) fire retardant | (B-1) melamine cyanurate 2 μm | parts by weight | — | 5.5 | — | 0.05 | 60.0 |
|  | (B-2) melamine cyanurate 14 μm | parts by weight | — | — | — | — | — |
|  | (B-3) brominated polystyrene | parts by weight | — | — | — | — | — |
|  | (B-4) antimony trioxide | parts by weight | — | — | — | — | — |
| (C) metal and/or salt thereof | (C-1) iodide copper | parts by weight | — | — | 0.045 | 0.045 | 0.045 |
| (D) ring-containing compound | (D-1) 2-mercaptobenzoimidazole | parts by weight | — | — | 0.035 | 0.035 | 0.035 |
|  | (D-2) 2-mercaptobenzothiazole | parts by weight | — | — | — | — | — |
| (E) hydroxyl-containing compound | (E-1) high concentration preliminary mixture | parts by weight | — | — | — | — | — |
| heat aging resistance | retained tensile elongation rate after 125° C. × 125 hr treatment | % | 3 | 2 | 70 | 70 | 10 |
|  | color tone change ΔE* in 190° C. × 2 hr treatment | — | 48 | 44 | 37 | 35 | 40 |
| flowability | 0.5 mm-thick bar flow length | mm | 75 | 70 | 70 | 75 | 50 |
| press fitting property | number of cracked ones out of 30 specimens | number | 13 | 17 | 10 | 10 | 30 |
| fire retardancy | 0.38 mm according to UL94 | — | HB | V-2 | HB | HB | V-0 |

|  |  |  | Comparative example 6 | Comparative example 7 | Comparative example 8 | Comparative example 9 |
|---|---|---|---|---|---|---|
| (A) polyamide resin | (A-1) nylon 6 | parts by weight |  |  |  |  |
|  | (A-1) nylon 66 | parts by weight | 100 | 100 | 100 | 100 |

TABLE 2-continued

| | | | | | | |
|---|---|---|---|---|---|---|
| (B) fire retardant | (B-1) melamine cyanurate 2 μm | parts by weight | 5.5 | 5.5 | 5.5 | 5.5 |
| | (B-2) melamine cyanurate 14 μm | parts by weight | — | — | — | — |
| | (B-3) brominated polystyrene | parts by weight | — | — | — | — |
| | (B-4) antimony trioxide | parts by weight | — | — | — | — |
| (C) metal and/or salt thereof | (C-1) iodide copper | parts by weight | 0.00045 | 1.350 | 0.045 | — |
| (D) ring-containing compound | (D-1) 2-mercaptobenzoimidazole | parts by weight | 0.00035 | 1.050 | — | — |
| | (D-2) 2-mercaptobenzothiazole | parts by weight | — | — | — | — |
| (E) hydroxyl-containing compound | (E-1) high concentration preliminary mixture | parts by weight | — | — | — | 4.4 |
| heat aging resistance | retained tensile elongation rate after 125° C. × 125 hr treatment | % | 4 | 35 | 40 | 45 |
| | color tone change ΔE* in 190° C. × 2 hr treatment | — | 44 | 35 | 39 | 35 |
| flowability | 0.5 mm-thick bar flow length | mm | 75 | 70 | 70 | 80 |
| press fitting property | number of cracked ones out of 30 specimens | number | 15 | 30 | 22 | 10 |
| fire retardancy | 0.38 mm according to UL94 | — | V-2 | HB | HB | V-2 |

The results in Table 1 show that our polyamide resin composition is good in terms of retained tensile elongation rate and suppression of color tone change measured after heat aging treatment. It is also good in terms of flowability, press fitting property at low temperatures, and fire retardancy. It can also be seen that as a result, the molded products can show good characteristics to serve as material for small electric/electronic components and automobile components over a wide range of environmental conditions. On the other hand, the results in Table 2 show that the specimens failing to meet the requirements of the range of our polyamide resin composition have deteriorated characteristics in terms of heat aging resistance, press fitting property, and fire retardancy.

The invention claimed is:

1. A polyamide resin composition comprising 100 parts by weight of a polyamide resin (A), 0.1 to 50 parts by weight of a fire retardant (B), 0.001 to 1 part by weight of a metal and/or salt thereof (C), and 0.001 to 1 part by weight of a compound (D) as represented by formula [I]:

QX  [I]

wherein in formula [I], Q represents an aromatic hydrocarbon group or an alicyclic hydrocarbon group and X represents a 5-membered heterocyclic ring group, Q and X forming a covalent bond or a fused ring, and [N]/[M] is 0.1 or more and 0.52 or less, [M] representing the number of moles of the metal contained in the metal and/or salt thereof (C) as measured by atomic absorption spectroscopy and [N] representing the number of moles of the compound (D) in the polyamide resin composition extracted with acetone.

2. The polyamide resin composition as set forth in claim 1, wherein the metal and/or salt thereof (C) is at least one metal selected from the group consisting of copper, iron, zinc, nickel, manganese, cobalt, chromium and tin, and/or at least one salt thereof.

3. The polyamide resin composition as set forth in claim 1, wherein X in the compound (D) is one selected from the group consisting of furan, pyrrole, imidazole, oxazole, thiazole and pyrazole.

4. The polyamide resin composition as set forth in claim 1, wherein the compound (D) is at least one of 2-mercaptobenzoimidazole and 2-mercaptobenzothiazole.

5. The polyamide resin composition as set forth in claim 1, wherein the fire retardant (B) contains a triazine based compound.

6. The polyamide resin composition as set forth in claim 1, wherein the fire retardant (B) is melamine cyanurate.

7. The polyamide resin composition as set forth in claim 1, further comprising 0.1 to 20 parts by weight of a compound (E) containing at least three hydroxyl groups relative to 100 parts by weight of the polyamide resin.

8. A molded article containing a polyamide resin composition as set forth in claim 1.

9. A method of producing a polyamide resin composition as set forth in claim 1 by melt-kneading 100 parts by weight of a polyamide resin (A), 0.1 to 50 parts by weight of a fire retardant (B), 0.001 to 1 part by weight of a metal and/or salt thereof (C), and 0.001 to 1 part by weight of a compound (D) as represented by formula [I]:

QX  [I]

wherein in formula [I], Q represents an aromatic hydrocarbon group or an alicyclic hydrocarbon group and X represents a 5-membered heterocyclic ring group, Q and X forming a covalent bond or a fused ring.

* * * * *